United States Patent
Ausubel et al.

(10) Patent No.: US 7,899,734 B2
(45) Date of Patent: Mar. 1, 2011

(54) SYSTEM AND METHOD FOR AN AUCTION OF MULTIPLE TYPES OF ITEMS

(76) Inventors: Lawrence M. Ausubel, Washington, DC (US); Peter C. Cramton, Bethesda, MD (US); Wynne P. Jones, Oxford (GB)

( * ) Notice: Subject to any disclaimer, the term of this patent is extended or adjusted under 35 U.S.C. 154(b) by 1296 days.

(21) Appl. No.: 10/467,868

(22) PCT Filed: May 31, 2002

(86) PCT No.: PCT/US02/16937

§ 371 (c)(1),
(2), (4) Date: Feb. 9, 2004

(87) PCT Pub. No.: WO02/097582

PCT Pub. Date: Dec. 5, 2002

(65) Prior Publication Data

US 2005/0102215 A1    May 12, 2005

Related U.S. Application Data

(63) Continuation of application No. 09/898,483, filed on Jul. 5, 2001, now Pat. No. 7,165,046.

(60) Provisional application No. 60/294,246, filed on May 31, 2001.

(51) Int. Cl.
*G06Q 40/00* (2006.01)
(52) U.S. Cl. .......................... 705/37; 705/26.1; 705/27; 705/35
(58) Field of Classification Search ................ 705/26, 705/27, 35
See application file for complete search history.

(56) References Cited

U.S. PATENT DOCUMENTS 3,573,747 A    4/1971    Adams et al.

(Continued)

FOREIGN PATENT DOCUMENTS

| WO | WO 96/34356 | 10/1996 |
|----|-------------|---------|
| WO | WO 97/37315 | 10/1997 |

OTHER PUBLICATIONS

Dialog Abstract: File 610, Acc#0489267; "Onsale: Onsale Brings Thrill of Auctions and Bargain Hunting Online; Unique Internet retail service debuts with week-long charity auction for The Computer Museum in Boston"; May 24, 1995.

(Continued)

*Primary Examiner* — Jason Dunham
(74) *Attorney, Agent, or Firm* — Manatt, Phelps & Phillips LLP

(57) ABSTRACT

An improved system and method for a computer-implemented auction in which multiple types of items are auctioned together without imposing a particular division of supply or demand among the individual types of items. In some embodiments the auction of the present invention provides a means or method for establishing prices for the types of items, wherein the prices maintain a relationship. In other embodiments, the present invention provides a means or method for implying prices from price parameters in the bids received form bidders, based on a relation among the prices for the types of items. Market clearing may be defined by the condition that the aggregate quantity bid for all types of items is less than or equal to the available quantity of all types of items. The division among the types of items within is thus determined flexibly, based on the bids at the associated prices. In other embodiments, market clearing is defined by the condition that the quantity bid for one selected type of item is less than or equal to the available quantity of the selected type of item. The quantities of the other types of items are thus determined flexibly, based on the bids at the associated prices.

60 Claims, 12 Drawing Sheets

U.S. PATENT DOCUMENTS

| | | | |
|---|---|---|---|
| 3,581,072 A | 5/1971 | Nymeyer | |
| 4,789,928 A | 12/1988 | Fujisaki | |
| 4,789,929 A | 12/1988 | Nishimura et al. | |
| 5,077,665 A | 12/1991 | Silverman et al. | |
| 5,136,501 A | 8/1992 | Silverman et al. | |
| 5,235,680 A | 8/1993 | Bijnagte | |
| 5,283,731 A | 2/1994 | Lalonde et al. | |
| 5,394,324 A | 2/1995 | Clearwater | |
| 5,664,115 A | 9/1997 | Fraser | |
| 5,689,652 A | 11/1997 | Lupien et al. | |
| 5,727,165 A | 3/1998 | Ordish et al. | |
| 5,835,896 A | 11/1998 | Fisher et al. | |
| 5,890,138 A * | 3/1999 | Godin et al. | 705/26 |
| 5,905,975 A | 5/1999 | Ausubel | |
| 5,924,083 A | 7/1999 | Silverman | |
| 6,012,045 A | 1/2000 | Barzilai | |
| 6,021,398 A | 2/2000 | Ausubel | |
| 6,023,685 A | 2/2000 | Brett | |
| 6,023,686 A | 2/2000 | Brown | |
| 6,026,383 A | 2/2000 | Ausubel | |
| 6,047,264 A | 4/2000 | Fisher et al. | |
| 6,151,589 A * | 11/2000 | Aggarwal et al. | 705/36 R |
| 6,199,050 B1 * | 3/2001 | Alaia et al. | 705/37 |
| 6,243,691 B1 | 6/2001 | Fisher et al. | |
| 6,272,473 B1 | 8/2001 | Sandholm | |
| 6,718,312 B1 | 4/2004 | McAfee et al. | |
| 6,968,323 B1 * | 11/2005 | Bansal et al. | 705/80 |
| 7,062,461 B1 | 6/2006 | Ausubel | |
| 7,133,841 B1 | 11/2006 | Wurman et al. | |
| 7,165,046 B2 | 1/2007 | Ausubel | |
| 7,249,027 B1 | 7/2007 | Ausubel | |
| 7,337,139 B1 | 2/2008 | Ausubel | |
| 7,343,342 B2 | 3/2008 | Ausubel | |
| 2001/0039528 A1 * | 11/2001 | Atkinson et al. | 705/37 |
| 2001/0049650 A1 | 12/2001 | Moshal | |
| 2002/0013757 A1 * | 1/2002 | Bykowsky et al. | 705/37 |
| 2004/0024687 A1 * | 2/2004 | Delenda | 705/37 |
| 2004/0054551 A1 | 3/2004 | Ausubel et al. | |
| 2005/0289043 A1 * | 12/2005 | Maudlin | 705/37 |
| 2006/0167787 A1 | 7/2006 | Ausubel | |
| 2007/0297328 A1 * | 12/2007 | Semret et al. | 370/230 |

OTHER PUBLICATIONS

"Onsale Joins Fray as Online Shopping Picks Up Speed: Internet Booms"; *Computer Reseller News*; p. 73, Jun. 5, 1995; Dialog: File 16, Acc#05649796.

Siegmann; "Nowhere to Go But Up. (Onsale CEO Jerry Kaplan) (PC Week Inside) (Inside People)"; PC Week; v12 n42; pA5 (1); Oct. 23, 1995; Dialog: File 148, Acc#08222496.

Bidder Information Packet for FCC auction scheduled for Dec. 11, 1995, pp. 33-36, 47, 57-59.

Bidder Information Packet for FCC auction scheduled for Aug. 2, 1995, pp. 99-104.

ACE Market Operations Guide, Sholtz & Associates, LLC, Jan. 3, 1996, pp. 1-5.

J. S. Banks, J. O. Ledyard and D. P. Porter, "Allocating Uncertain and Unresponsive Resources: An Experimental pproach", Rand Journal of Economics, vol. 20, No. 1, Spring 198 pp. 1-25.

G. Demange, D. Gale and M. Sotomayer, "Multi-Item Auctions", Journal of Political Economy vol. 4, No. 4, 1986, pp. 863-872.

F. Gul and E. Stacchetti, "English Auctions with Multiple Goods", Princeton University and The University of Michigan, Mimeo, Oct. 12, 1995, pp. 1-20.

R. P. McAfee and J. McMillan, "Auctions and Bidding", Journal of Economic Literature, vol. 25, Jun. 1987, pp. 699-738.

K. A. McCabe, S. J. Rassenti and V. L. Smith, "Testing Vickrey's and Other Simultaneous Multiple Unit Versions of the English Auction," Research in Experimental Economics, vol. 4, Greenwich, CT: JAI Press, 1991, pp. 45-79.

F. M. Menezes, Four Essays on Auction Theory, University of Illinois doctoral dissertation, Feb. 1993, pp. 1-97 and 143-152.

P. R. Milgrom and R. J. Weber, "A Theory of Auctions and Competitive Bidding," Econometrica, vol. 50, No. 5Sep. 1982, pp. 1089-1122.

M. H. Rothkopf, T. J. Teisberg and E. P. Kahn, "Why Are Vickrey Auctions Rare?"Journal of Political Economy, vol. 98, No. 1, 1990, pp. 94-109.

U.S. Department of the Treasury, U.S. Securities and Exchange Commission, and Board of Governors of the Federal Reserve System, Joint Report on the Government Securities Market, Washington, D.C.: U.S.G.P.O., Jan. 1992, pp. ix-xvi, 1-34, B-17-B-24.

W. Vickrey, "Counterspeculation, Auctions, and Competitive Sealed Tenders," Journal of Finance, vol. 16, 1961, pp. 8-37.

W. Vickrey, "Auctions and Bidding Games", Recent Advances in Game Theory, Princeton: Princeton University Conference, 1962, pp. 15-29.].

W. Vickrey, "Auctions, Markets, and Optimal Allocation", Bidding and Auctioning for Procurement and Allocation, New York: New York University Press 1976, pp. 13-20.

R. J. Weber, "Multiple-Object Auctions", Auctions, Bidding, and Contracting: Uses and Theory, New York: New York University Press, 1983, pp. 165-191.

R. Wilson, "Auction of Shares", Quarterly Journal of Economics, vol. 94, 1979, pp. 675-689.

L. M. Ausubel, "An Efficient Ascending-Bid Auction for Multiple Objects," Working Paper 97-06, University of Maryland, Jun. 1997.

Charles River Associates and Market Design Inc., "Auction Design Enhancements for Non-Combinatorial Auctions," Report to the Federal Communications Commission, Sep. 1997.

P. Cramton, A. Parece and R. Wilson, (Cramton 1) "Auction Design for Standard Offer Service," mimeo, Charles River Associates and Market Design Inc., Sep. 1997.

P. Cramton, A. Parece and R. Wilson, (Cramton 2) "Rules for Standard Offer Service Auction," mimeo, Charles River Associates and Market Design Inc., Aug. 1997.

Federal Communications Commission, "Bidder Information Package for FCC Entrepreneurs' Auction of Broadband PCS Basic Trading Area Licenses, Frequency Block C, Scheduled for Aug. 2, 1995," pp. 1-108.

K. A. McCabe, S. J. Rassenti and V. L. Smith, "Auction Institutional Design: Theory and Behavior of Simultaneous Multiple-Unit Generalizations of the Dutch and English Auctions." American Economic Review, Dec. 1990, 80(5): 1276-1283.

F. M. Menezes, Four Essays on Auction Theory, University of Illinois doctoral dissertation, Feb. 1993.

U.S. Department of the Treasury, U.S. Securities and Exchange Commission, and Board of Governors of the Federal Reserve System, Joint Report on the Government Securities Market, Washington, D.C.: U.S.G.P.O., Jan. 1992.

Topkis, Donald (1979), "Minimizing a Submodular Function on a Lattice," Operations Research 28, 358-368.

W. Vickrey, "Counterspeculation, Auctions and Competitive Sealed Tenders," Journal of Finance, Mar. 1961, 16(1): 8-37.

R. Wilson, "Activity Rules for a Power Exchange," Report to the California Trust for Power Industry Restructuring, Feb. 1997.

* cited by examiner

SYSTEM AND METHOD FOR AN AUCTION OF MULTIPLE TYPES OF ITEMS

RELATED APPLICATIONS

This application claims the benefit of the filing dates of the following co-pending U.S. applications:

Ausubel, "SYSTEM AND METHOD FOR AN EFFICIENT DYNAMIC AUCTION FOR MULTIPLE TYPES OF ITEMS", U.S. Provisional Patent Application, Ser. No. 60/294,246 Filed: May 31, 2001.

Ausubel, "SYSTEM AND METHOD FOR AN EFFICIENT DYNAMIC MULTI-UNIT AUCTION", U.S. patent application, Ser. No. 09/898,483 Filed: Jul. 5, 2001.

FIELD OF THE INVENTION

The present invention relates to improving computer-implemented auctions and, more particularly, to computer implementation of an auction in which multiple types of items are auctioned together.

BACKGROUND OF THE INVENTION

Sellers and buyers of commodities, financial securities, and other goods and services are increasingly turning to auctions to assist in the sale or purchase of a wide range of items. Auctions are useful for selling a unique item (e.g., a painting), a single type of item available in multiple units (e.g., 10 tons of gold), and multiple types of items available in multiple units (e.g., 10 tons of gold and 20 tons of silver). And just as auctions are useful for efficiently selling items at maximum price, they are also useful for efficiently procuring items at minimum cost.

Auction formats in the art tend generally to be of the sealed-bid or ascending-bid variety. In standard sealed-bid auctions, bidders—in one single bidding round—simultaneously and independently submit bids to the auctioneer, who then determines the auction outcome. In standard ascending-bid auctions, bidders—in a dynamic bidding process—submit bids in real time until no more bids are forthcoming. Sealed-bid auction formats offer the advantage of speed of the auction process. Ascending-bid auction formats offer the advantage that there is feedback among participants' bids, which tends to result in more aggressive bidding and in more efficient auction outcomes.

When auction systems and methods in the art are used to sell (or buy) multiple types of items, the auctioneer generally specifies an available supply (or demand) for each type of item. For example, the auctioneer announces a supply of 10 tons of gold and 20 tons of silver, and then solicits bids, in a sealed-bid or ascending-bid procedure, in order to obtain market-clearing prices for each of the two types of commodities.

However, consider a situation where the types of items are related, for example, contracts for provision of a commodity covering different time periods. For example, a government may wish to sell three types of financial securities: 3-month Treasury bills; 6-month Treasury bills; and 12-month Treasury bills. The government's only constraint may be that it needs to sell $50 billion worth of new debt securities at this auction, since this is the quantity of old debt securities that are maturing in the current calendar quarter. However, the government may have no preference as to how the required $50 billion is divided among 3-month bills, 6-month bills, and 12-month bills, respectively, and the government may simply wish to "let the market decide" the division among the various durations Auction systems and methods in the art provide effective ways for the government to sell bonds with a fixed division among the various durations. However, new and better systems and methods can be devised for "letting the market decide" the division among the various durations. The same problem also occurs in real life in the sale of contracts for electricity and all kinds of other commodities, as well as in the procurement of related items. In several preferred embodiments, the present invention provides a system and method for the government in the above example to simply auction $50 billion of Treasury bills at the lowest possible cost (relative to the market's yield curve), without imposing a particular division among the various durations.

SUMMARY OF THE INVENTION

The present invention is an improved system and method for a computer-implemented auction, particularly for a computer-implemented auction in which multiple types of items are auctioned together. In several embodiments, the present invention provides a system and method to conduct an auction of a group of related types of items, without imposing a particular division of supply or demand among the individual types of items within the group. In other embodiments, the present invention provides a system and method to conduct an auction of a group of related types of items, without imposing a particular division of supply or demand on some of the individual types of items within the group. Instead, in some embodiments, the present invention provides a means or method for establishing prices for the types of items within a group, wherein the prices maintain a relationship. In other embodiments, the present invention provides a means or method for implying prices from price parameters in the bids received from bidders, based on a relation among the prices for the types of items within a group.

In some embodiments, market clearing is defined by the condition that the aggregate quantity bid for all types of items within a group is less than or equal to the available quantity of all types of items within the group. The division among the types of items within the group is thus determined flexibly, based on the bids at the associated prices. In other embodiments, market clearing is defined by the condition that the quantity bid for one selected type of item within a group is less than or equal to the available quantity of the selected type of item. The quantities of the other types of items within the group are thus determined flexibly, based on the bids at the associated prices.

In a first preferred embodiment, the present invention is:

A computer implemented method for conducting an auction of a plurality of types of items among a plurality of bidders, wherein bids are received and an allocation of the items among the bidders is determined based on the bids, comprising:

establishing prices for the plurality of types of items, wherein the prices maintain a relationship, receiving bids associated with the established prices, and processing the received bids to determine an allocation of the items among the bidders consistent with the bids in the event that an allocation consistent with the bids is possible, otherwise altering the established prices for the plurality of types of items.

In a second preferred embodiment, the present invention is a computer system for conducting an auction according to the method of the first preferred embodiment. The system includes an establishing means, a receiving means, and a processing means.

In both the first and second preferred embodiments, the relationship or relation among the prices may involve a schedule or algorithm. In the event that the relationship or relation is based on a schedule, determining prices may involve looking up and possibly interpolating numbers that are contained in a table. Alternatively the relationship or relation may be represented as an algorithm or a formula that provides a relationship among the prices. The data table may reflect a market beyond the auction (for example, it may reflect price differentials in a separate commodities market or exchange) and the data table may change during the course of the auction (for example, if price differentials change in the separate commodities market or exchange, or if a significant news event occurs during the course of the auction). Similarly, the data set to which the algorithm or formula are applied may reflect a market beyond the auction and the data set may change during the course of the auction.

In a third preferred embodiment, the present invention is:

A computer implemented method for conducting an auction of a plurality of types of items among a plurality of bidders, wherein bids are received and an allocation of the items among the bidders is determined based on the bids, comprising:
  receiving bids comprising a quantity parameter for at least one of the types of items in the auction and a price parameter, and
  processing the received bids to determine an allocation of the items among the bidders consistent with the bids in the event that an allocation consistent with the bids is possible, wherein the
  processing includes implying prices from price parameters in the received bids based on a fixed relation among the prices of the plurality of types of items.

In a fourth preferred embodiment, the present invention is a computer system for conducting an auction according to the method of the third preferred embodiment. The system includes a receiving means and a processing means.

In both the third and fourth preferred embodiments, the "price parameters" in the received bids that are used for "implying prices" could be prices for one or more selected types of items. (For example, the price parameter could be an actual price for 3-month Treasury bills, and the prices for 6-month and 12-month Treasury bills could be implied, based on a fixed relation among the prices.) The "price parameters" could also be neutral parameters or indicators (e.g., in the nature of an index) of a price.

Indeed, in a fifth preferred embodiment, bids include price parameters that may be a particularly useful form of neutral parameter. For example, an auctioneer may announce a starting price vector of (4.00, 4.50, 4.75) and an ending price vector of (8.00, 8.50, 8.75). If a bidder enters a price parameter of 25%, this may signify that the bidder is indicating a price which is 25% of the distance from the starting price to the ending price, i.e., an implied price vector of (5.00, 5.50, 5.75). In the fifth preferred embodiment, the present invention is:

A computer implemented method for conducting an auction of at least one type of item among a plurality of bidders in a plurality of rounds, wherein bids are received and an allocation of the items among the bidders is determined based on the bids, comprising:
  establishing starting prices and ending prices for each type of item in a plurality of rounds,
  receiving bids, wherein a bid comprises a quantity for at least one type of item and a price parameter signifying a percentage of the distance from the established starting prices to the established ending prices, and
  processing the received bids to determine an allocation of the items among the bidders consistent with the bids in the event that an allocation consistent with the bids is possible, otherwise altering the established prices for at least one type of item.

In a sixth preferred embodiment, the present invention is a computer system for conducting an auction according to the method of the fifth preferred embodiment. The system includes an establishing means, a receiving means, and a processing means.

Various preferred embodiments of the present invention resolve a number of important limitations to the systems and methods for computer-implemented auctions in the art. Thus, the present invention offers the further technical effect of improving computer-implemented auctions, making them operate more efficiently. The present invention improves the ability of bidders to readily participate in the auction and to express their needs and preferences. The present invention improves the ability of the auctioneer to sell at higher prices the items being sold in the auction or to obtain at lower cost the items being procured in the auction. The present invention improves the efficiency of the auction process by enabling the auction to operate in shorter time, expending less computer time, fewer communications resources, and less bidder and auctioneer time. Finally, the present invention improves the allocative efficiency of the auction process by better allocating items to bidders who value them the highest (or, in a procurement auction, to bidders who can provide them at lowest cost).

Certain constraints are desirable in order for the present invention to operate optimally and to reach an economically efficient outcome. In many auctions, it is desirable to impose constraints on bidders that require them to bid significantly on items early in the auction in order for them to be allowed to bid on items later in the auction. Otherwise, one may find oneself in a situation where bidders refrain from submitting serious bids until near the very end of the auction, defeating the purpose of a dynamic auction. One exemplary constraint is an activity rule which constrains a bidder not to increase his quantity, summed over all of the types of items within a group, from one round to the next. Another exemplary constraint is a more stringent activity rule which constrains a bidder not to increase his quantity, individually on each of the individual types of items, from one bid or one round to the next. A third exemplary constraint is a reduction rule which constrains a bidder not to decrease his quantity, for any single type of item, beyond the point where the sum of the quantities bid for this type of item by all bidders equals the sum of the quantities being auctioned. (If, in a given round, two or more bidders simultaneously attempt to decrease their quantities, for any single type of item, having the effect of reducing bids beyond the point where the sum of the quantities bid for this type of item by all bidders equals the sum of the quantities being auctioned, the auction procedure will resolve this discrepancy. For example, the auctioneer may honor these attempts to decrease in order of time priority, or may ration these simultaneous attempts to decrease in proportion to the attempted reductions.)

The present invention includes treating the case of auctioning a set of items which includes two (or more) items that are neither identical nor perfect substitutes to one another. Henceforth, this will be described for short as a situation with "multiple types of items," or simply "heterogeneous items" or "heterogeneous objects." Often, but not always, the heterogeneous items auctioned together will bear some relationship to one another: for example, they may be securities issued by the same entity but with different durations to maturity; or contracts for the same goods or services but with different durations.

One particularly salient use for the present invention is as follows. A national government or a private corporation may wish to simultaneously sell 3-month, 6-month and 12-month bonds or notes. More generally, these may be contracts for provision of any commodity; the contracts are for the same commodity, but covering different but possibly overlapping time periods. For the government's or corporation's purposes, the allocation of sales among the 3-month, 6-month and 12-month bonds or notes may not be critical; the main issue is that the total quantity of the bonds or notes of the three durations add up to the desired dollar figure. Meanwhile, the current "yield curve" on financial markets may have 6-month bonds or notes yielding interest rates 0.50% higher than 3-month bonds or notes, and the current "yield curve" on financial markets may have 12-month bonds or notes yielding interest rates 0.25% higher than 6-month bonds or notes. Under these circumstances, the government or corporation may utilize the present invention by beginning the auction with an (interest rate) vector of (6.00%, 6.50%, 6.75%) for the three respective durations. If the aggregate quantity of the bonds or notes desired by all the bidders at these interest rates is greater than the quantity of bonds or notes that the government or corporation wishes to sell, the government or corporation might then continue the auction by announcing a new vector of (5.99%, 6.49%, 6.74%) for the three respective durations. If the aggregate quantity of the bonds or notes desired by all the bidders at these interest rates is still greater than the quantity of bonds or notes that the government or corporation wishes to sell, the government or corporation might then continue the auction by announcing a new vector of (5.98%, 6.48%, 6.73%) for the three respective durations. The auction continues in this way, with the government or corporation always following the yield curve in setting the relative interest rates for the various durations. Meanwhile, bidders are held to the exemplary activity rule which constrains a bidder not to increase his quantity, summed over the m types of items, from one round to the next. That is, the bidder is allowed to change the mix of 3-month, 6-month and 12-month bonds or notes that he demands, but his total quantity demanded of bonds or notes may not be increased as the interest rate goes down.

A second use for the present invention is as follows. An electric utility may wish to sell contracts to provide a given quantity of electricity for 3-month, 6-month and 12-month durations. For the electric utility's purposes, the allocation of sales among the 3-month, 6-month and 12-month contracts may not be critical; the main issue may be that the total quantity of the contracts add up to a desired amount of electricity. Meanwhile, current energy prices may imply that a 6-month contract should be priced at $2 per-unit higher than a 3-month contract, and that a 12-month contract should be priced at $1 per unit higher than a 6-month contract. Under these circumstances, the electric utility may utilize the present invention by beginning the auction with a price vector of ($10.50, $12.50, $13.50) for the three respective durations. If the aggregate quantity of contracts desired by all the bidders at these prices is greater than the quantity of contracts that the electric utility wishes to sell, the electric utility might then continue the auction by announcing a new price vector of ($10.60, $12.60, $13.60) for the three respective durations. If the aggregate quantity of contracts desired by all the bidders at these prices is still greater than the quantity of contracts that the electric utility wishes to sell, the electric utility might then continue the auction by announcing a new price vector of ($10.70, $12.70, $13.70) for the three respective durations. The auction continues in this way, with the electric utility always following the implied price differential in setting the relative prices for the various durations. Meanwhile, bidders are held to the exemplary activity rule which constrains a bidder not to increase his quantity, summed over the types of items within a group, from one round to the next. That is, the bidder is allowed to change the mix of 3-month, 6-month and 12-month contracts that he demands, but his total quantity demanded of contracts may not be increased as the price goes up.

In addition, the present invention may also be used to auction two or more groups of types of items. For example, the previous electric utility example could be complicated by the presence of two groups of electricity contracts: base and peak. (Base-load quantity is produced all of the time while peak-load quantity is only produced at times of peak demand.) Within each group, there might be three durations of contracts. Thus, in total, there could be six contracts for sale: 3-month, 6-month and 12-month base contracts; and 3-month, 6-month and 12-month peak contracts. To continue the example, current energy prices may imply that a 6-month base contract should be priced at $2 per unit higher than a 3-month base contract, and that a 12-month base contract should be priced at $1 per unit higher than a 6-month base contract. Meanwhile, current energy prices may imply that a 6-month peak contract should be priced at $3 per unit higher than a 3-month peak contract, and that a 12-month peak contract should be priced at $2 per unit higher than a 6-month peak contract.

Under these circumstances, the electric utility may utilize the present invention by beginning the auction with a price vector of ($10.50, $12.50, $13.50) for the three respective base durations and a price vector of ($26.50, $29.50, $31.50) for the three respective peak durations. If the aggregate quantity of base contracts desired by all the bidders at these prices is slightly greater than the quantity of base contracts that the electric utility wishes to sell, but the aggregate quantity of peak contracts desired by all the bidders at these prices is much greater than the quantity of peak contracts that the electric utility wishes to sell, the electric utility might then continue the auction by announcing a new price vector of ($10.60, $12.60, $13.60) for the three respective base durations and a price vector of ($29.20, $32.20, $34.20) for the three respective peak durations. If the aggregate quantity of base contracts desired by all the bidders at these prices is still slightly greater than the quantity of base contracts that the electric utility wishes to sell, and the aggregate quantity of peak contracts desired by all the bidders at these prices is still somewhat greater than the quantity of peak contracts that the electric utility wishes to sell, the electric utility might then continue the auction by announcing a new price vector of ($10.60, $12.60, $13.60) for the three respective base durations and a price vector of ($29.40, $32.40, $34.40) for the three respective peak durations. The auction continues in this way, with the electric utility always following the implied price differential in setting the relative prices for the various durations within a group. (However, between groups, the prices may go up at very different rates.) Meanwhile, bidders are held to the exemplary activity rule which constrains a bidder not to increase his quantity, summed over the types of items within a group, from one round to the next. That is, the bidder is allowed to change the mix of 3-month, 6-month and 12-month base contracts that he demands, but his total quantity demanded of base contracts may not be increased as the price goes up. Similarly, the bidder is allowed to change the mix of 3-month, 6-month and 12-month peak contracts that he demands, but his total quantity demanded of peak contracts may not be increased as the price goes up. However, in this exemplary embodiment, the bidder is not allowed to substitute any quantity between the base group and the peak group.

In many of the preferred embodiments, the auction with two or more groups of types of items ends at the first moment in time that the aggregate quantity of items bid for by all the bidders within each group is less than or equal to the quantity of items being auctioned within each group.

An auction in accordance with an embodiment of the present invention could also allow various improvements to the bidding rules. In the previous example of base contracts and peak contracts, it may be the case that even if the price of only one group goes up, a bidder may be permitted to reduce his demands in both product groups. For example, if the base price vector is held constant and the peak price vector goes up, a bidder may be permitted to reduce his quantity bid on both base and peak products. The reason for allowing this is that the base and peak product may be complements (loosely speaking, products that are useful together, such as left shoes and right shoes), so an increased price for one product could reduce a bidder's demand for both.

Throughout this document, the terms "objects", "items", "units" and "goods" are used essentially interchangeably. The inventive system and method may be used both for tangible objects, such as real or personal property, and intangible items, such as telecommunications licenses or electric power. The inventive system and method may be used in auctions where the auctioneer is a seller, buyer or broker, the bidders are buyers, sellers or brokers, and for auction-like activities which cannot be interpreted as selling or buying. The inventive system and method may be used for items including, but not restricted to, the following: public-sector bonds, bills, notes, stocks, and other securities or derivatives; private-sector bonds, bills, notes, stocks, and other securities or derivatives; communication licenses and spectrum rights; clearing, relocation or other rights concerning encumbrances of spectrum licenses; electric power and other commodity items; rights for terminal, entry, exit or transmission capacities or other rights in gas pipeline systems; airport landing rights; emission allowances and pollution permits; and other goods, services, objects, items or other property, tangible or intangible. It may also be used for option contracts on any of the above. It may be used in initial public offerings, secondary offerings, and in secondary or resale markets.

The present invention is useful for "reverse auctions" conducted by or for buyers to acquire various kinds of items or resources, "standard auctions" conducted by sellers in which items are offered for sale, and "exchanges" in which both buyers and sellers place bids. Although terms such as "items or quantities demanded" (by a bidder) and "demand curve" (of a bidder) are used to describe the present invention, the terms "items or quantities offered" (by a bidder) and "supply curve" (of a bidder) are equally applicable. In some cases, this is made explicit by the use of both terms, or by the use of the terms "items or quantities transacted" (by a bidder) and "transaction curve" (of a bidder). The term "items or quantities transacted" includes both "items or quantities demanded" and "items or quantities offered". The term "bid" includes both offers to sell and offers to buy. The term "transaction curve" includes both "demand curve" and "supply curve". Moreover, any references to "items or quantities being offered" includes both "items or quantities being sold" by the auctioneer, in the case this is a standard auction for selling items, as well as "items or quantities being bought or procured" by the auctioneer, in the case this is a reverse auction for buying items or procuring items.

Moreover, while standard auctions to sell typically involve ascending prices and reverse auctions to buy typically involve descending prices, the present invention may utilize prices that ascend and/or descend.

While an auction method following this description could be conducted manually, computerized implementation of the auction method on an auction system allows the auction to be conducted with all bidding information taken into account, while carefully controlling the degree to which the information itself is disclosed to the participants. In one embodiment, all bidding information is displayed to the bidders. In another embodiment, no bidding information is displayed to the bidders; only the results of the auction are displayed. A number of intermediate embodiments are also possible, in which some but not all bidding information is displayed to the bidders. For example, in one preferred embodiment, the auctioneer discloses only the aggregate quantity bid for each type of item in each round, as opposed to disclosing each individual bid.

Computerized implementation of the auction also allows the auction to be conducted swiftly and reliably, even if bidders are not located on-site. The auctioneer can receive large numbers of bids, determine the auction outcome, and transmit the results to bidders with minimal labor and in a very short span of time. In particular, sophisticated dynamic auction methods become feasible with a computer implementation; it becomes practical to operate iterative auction procedures in which there may be ten or more auction rounds, yet bidders can participate from different parts of the globe and the entire process can conclude in a single day.

The present invention comprises a computer that receives bids in a static or dynamic bidding process and assigns the items to bidders, and a method for receiving bids in a static or dynamic bidding process and assigning the items to bidders. In one embodiment, the invention comprises a Bidding Information Processor (BIP), a plurality of Bidding Terminals (BT's) communicatively coupled to the BIP, and an Auctioneer's Terminal (AT) communicatively coupled to the BIP. Bidders at the BT's enter bids in multiple rounds, and may observe displayed auction information. The BIP, BT's and AT communicate and process information in order to conduct an auction.

The network used, if any, can be any system capable of providing the necessary communication to/from a Bidding Information Processor (BIP), a Bidding Terminal (BT), and an Auctioneer's Terminal (AT). The network may be a local or wide area network such as, for example, Ethernet, token ring, the Internet, the World Wide Web, the information superhighway, an intranet or a virtual private network, or alternatively a telephone system, either private or public, a facsimile system, an electronic mail system, or a wireless communications system, or combinations of the foregoing.

The following patents and published applications are related to the present invention:

Ausubel, Lawrence M., U.S. Pat. No. 5,905,975, May 1999.
Ausubel, Lawrence M., U.S. Pat. No. 6,021,398, Feb. 2000.
Ausubel, Lawrence M., U.S. Pat. No. 6,026,383, Feb. 2000.
Ausubel, Lawrence M., Application No. 00304195.1 at the European Patent Office, May 2000.

The following other references may be related to the present invention:

Arrow, Kenneth, H. D. Block and Leonid Hurwicz (1959), "On the Stability of Competitive Equilibrium, II," *Econometrica* 27: 82-109.

Ausubel, Lawrence M. (1997a), "An Efficient Ascending-Bid Auction for Multiple Objects," Working Paper 97-06, University of Maryland, downloadable at www-ausubel-com.

Ausubel, Lawrence M. (1997b), "On Generalizing the English Auction," working paper, downloadable at www-ausubel-com.

Ausubel, Lawrence M. (2000), "An Efficient Dynamic Auction for Heterogeneous Commodities," working paper, University of Maryland, downloadable at www-ausubel-com.

Ausubel, Lawrence M. and Peter Cramton (1996), "Demand Reduction and Inefficiency in Multi-Unit Auctions," Working Paper No. 96-07, downloadable at www-ausubel-com.

Ausubel, Lawrence M. and Peter C. Cramton (1999), "The Optimality of Being Efficient," mimeo, University of Maryland, June 1999, downloadable at www-ausubel-com.

Ausubel, Lawrence M., Peter Cramton, R. Preston McAfee, and John McMillan (1997), "Synergies in Wireless Telephony: Evidence from the Broadband PCS Auctions," *Journal of Economics and Management Strategy,* 6:3, 497-527.

Ausubel, Lawrence M. and Jesse Schwartz (1999), "The Ascending Auction Paradox," Mimeo, University of Maryland and Vanderbilt University, July 1999.

Banks, Jeffrey S., John O. Ledyard and David P. Porter, "Allocating Uncertain and Unresponsive Resources: An Experimental Approach," *Rand Journal of Economics,* 20: 1-25.

Bernheim, B. Douglas and Michael Whinston (1986), "Menu Auctions, Resource Allocation and Economic Influence," *Quarterly Journal of Economics,* 101: 1-31.

Bikhchandani, Sushil, "Auctions of Heterogeneous Objects." Mimeo, UCLA, March 1996.

Bikhchandani, Sushil and John W. Mamer (1997), "Competitive Equilibrium in an Exchange Economy with Indivisibilities," *Journal of Economic Theory, June,* 74(2), pp. 385-413.

Bikhchandani, Sushil and Joseph M. Ostroy (1999), "The Package Assignment Problem," working paper, UCLA.

Cassady, Ralph (1967). *Auctions and Auctioneering.* Berkeley: University of California Press.

Charles River Associates and Market Design Inc. (1997), "Package Bidding for Spectrum Licenses," Report to the Federal Communications Commission, downloadable at www-fcc-gov.

Clarke, E. H. (1971), "Multipart Pricing of Public Goods," *Public Choice, XI,* 17-33.

Computer Reseller News, "Onsale Joins Fray as Online Shopping Picks Up Speed: Internet Booms," Jun. 5, 1995, p. 73; Dialog: File 16, Acc#05649796.

Cramton, Peter C., "Money Out of Thin Air: The Nationwide Narrowband PCS Auction." *Journal of Economics and Management Strategy,* Summer 1995, 4(2), pp. 267-343.

Cybernomics (2000), "An Experimental Comparison of the Simultaneous Multiple Round Auction and the CRA Combinatorial Auction." Report to the Federal Communications Commission, downloadable at www-fcc-gov.

Dasgupta, Partha and Eric S. Maskin (2000), "Efficient Auctions," *Quarterly Journal of Economics,* May, 115(2), pp. 341-388.

DasVarma, Gopal (2000), "The Pareto Optimality of Disclosing Bidder Identities," working paper, Duke University.

Demange, Gabrielle, David Gale, and Marilda Sotomayor, "Multi-Item Auctions." *Journal of Political Economy,* August 1986, 94(4), pp. 863-872.

DeMartini, Christine, Anthony Kwasnica, John Ledyard, and David Porter (1999), "A New and Improved Design for Multi-Object Iterative Auctions," Cal Tech working paper.

DeVries, Sven and Rakesh Vohra (2001), "Combinatorial Auctions: A Survey." Working paper. Available at www-m9.ma.tum-de.

Engelbrecht-Wiggans, Richard and Charles M. Kahn, "Protecting the Winner: Second-Price versus Oral Auctions." *Economics Letters,* March 1991, 35(3), pp. 243-248.

Engelbrecht-Wiggans, Richard and Charles M. Kahn (1998), "Multi-Unit Auctions with Uniform Prices," *Economic Theory,* September, 12(2), pp. 227-258.

Federal Communications Commission (1995), "Bidder Information Packet for FCC Auction Scheduled for Aug. 2, 1995."

Federal Communications Commission (1995), "Bidder Information Packet for FCC Auction Scheduled for Dec. 11, 1995."

Federal Communications Commission (2001), "Bidder Information Packet for FCC Auction No. 31."

Groves, Theodore (1973), "Incentives in Teams," *Econometrica* 61: 617-31.

Gul, Faruk and Ennio Stacchetti (1999), "Walrasian Equilibrium with Gross Substitutes," *Journal of Economic Theory,* 87, 9-124.

Gul, Faruk and Ennio Stacchetti (2000), "The English Auction with Differentiated Commodities," *Journal of Economic Theory, May,* 92(1), pp. 66-95.

Hahn, Frank H. (1982), "Stability," in Kenneth J. Arrow and Michael D. Intriligator, eds., *Handbook of Mathematical Economics, Volume II,* Amsterdam: North-Holland, pp. 745-793.

Jehiel, Philippe and Benny Moldovanu (1999), "Efficient Auctions with Interdependent Valuations," Working Paper No. 99-74, University of Mannheim, July.

Jehiel, Philippe and Benny Moldovanu (2000), "A Critique of the Planned Rules for the German UMTS/IMT-2000 License Auction," mimeo, University of Mannheim, March.

Jehiel, Philippe and Benny Moldovanu (2001), "The European UMTS/IMT-2000 License Auctions," working paper.

Kagel, John H., Ronald M. Harstad, and Dan Levin, "Information Impact and Allocation Rules in Auctions with Affiliated Private Values: A Laboratory Study." *Econometrica,* November 1987, 55(6), pp. 1275-1304.

Kagel, John H., Scott Kinross, and Dan Levin (2001), "Comparing Efficient Multi-Object Auction Institutions," mimeo, Ohio State University.

Kagel, John H. and Dan Levin (2001), "Behavior in Multi_Unit Demand Auctions: Experiments with Uniform Price and Dynamic Vickrey Auctions," *Econometrica, pp* 413-454.

Kelso, Alexander S. and Vincent P. Crawford (1982), "Job Matching, Coalition Formation, and Gross Substitutes," *Econometrica* 50: 1483-1504.

Krishna, Vijay and Motty Perry, "Efficient Mechanism Design." Mimeo, Penn State University and Hebrew University, March 1997.

Ledyard, John, David Porter and Antonio Rangel (1997), "Experiments Testing Multi-object Allocation Mechanisms," *Journal of Economics and Management Strategy,* 6: 639-675.

Manelli, Alejandro M., Martin Sefton and Benjamin S. Wilner, "Multi-Unit Auctions: A Comparison of Static and Dynamic Mechanisms." Mimeo, Arizona State University, University of Newcastle and LECG/Navigant Consulting, October 1999.

Maskin, Eric S. (1992), "Auctions and Privatization," in Horst Siebert, ed., *Privatization: Symposium in Honor of Herbert Giersch*, Tubingen: Mohr (Siebeck), pp. 115-136.

Maskin, Eric S. and John G. Riley, "Optimal Multi-unit Auctions," in Frank Hahn, ed., *The Economics of Missing Markets, Information, and Games*. Oxford: Oxford University Press, 1989, pp. 312-35.

McAfee, R. Preston and John McMillan, "Auctions and Bidding." *Journal of Economic Literature*, June 1987, 25(2), pp. 699-738.

McCabe, Kevin A., Stephen J. Rassenti, and Vernon L. Smith, "Auction Institutional Design: Theory and Behavior of Simultaneous Multiple-Unit Generalizations of the Dutch and English Auctions." *American Economic Review*, December 1990, 80(5), pp. 1276-1283.

K. A. McCabe, S. J. Rassenti and V. L. Smith, "Testing Vickrey's and Other Simultaneous Multiple Unit Versions of the English Auction," Research in Experimental Economics, vol. 4, Greenwich, Conn.: JAI Press, 1991, pp. 45-79.

McMillan, John (1994), "Selling Spectrum Rights," *Journal of Economics Perspectives*, 8: 145-162.

F. M. Menezes, *Four Essays on Auction Theory*, University of Illinois doctoral dissertation, February 1993, pp. 1-97 and 143-152.

Milgrom, Paul (1981), "Rational Expectations, Information Acquisition, and Competitive Bidding," *Econometrica*, 49: 921-43.

Milgrom, Paul (1987), "Auction Theory," in Truman F. Bewley, ed., *Advances in Economic Theory Fifth World Congress*. Cambridge: Cambridge University Press, 1987, pp. 1-32.

Milgrom, Paul (1996), "Auctioning the Radio Spectrum," downloadable at www-market-design.com.

Milgrom, Paul (2000). "Putting Auction Theory to Work: The Simultaneous Ascending Auction," *Journal of Political Economy*, 108:2, 245-272.

Milgrom, Paul and John Roberts (1991), "Adaptive and Sophisticated Learning in Repeated Normal Form Games," *Games and Economic Behavior*, 3: 82-100.

Milgrom, Paul and Robert Weber (1982), "A Theory of Auctions and Competitive Bidding," *Econometrica* 50: 1089-1122.

Milgrom, Paul R. and Robert J. Weber, "A Theory of Auctions and Competitive Bidding, II." Unpublished manuscript, Northwestern University, 1982.

Nisan, Noam (1999), "Bidding and Allocation in Combinatorial Auctions," working paper, www-cs-huji-ac-il.

Onsale release, "Onsale Brings Thrill of Auctions and Bargain Hunting Online; Unique Internet retail service debuts with week-long charity auction for The Computer Museum in Boston"; Dialog Abstract: File 610, Acc#0489267; May 24, 1995.

D. C. Parkes (1999), "iBundle: An Efficient Ascending Price Bundle Auction", *Proceedings ACM Conference on Electronic Commerce* (EC-99), Denver, 148-157.

Perry, Motty and Philip J. Reny (1999a), "An Ex-Post Efficient Auction," Working Paper, Hebrew University and University of Chicago, September.

Perry, Motty and Philip J. Reny (1999b), "An Ex-Post Efficient Multi-Unit Ascending Auction," Working Paper, Hebrew University and University of Chicago, September.

Plott, Charles (1997), "Laboratory Experimental Testbeds: Application to the PCS Auction," *Journal of Economics and Management Strategy*, 6: 605-638.

Rassenti, S. J., V. L. Smith, and R. L. Bulfin (1982), "A Combinatorial Auction Mechanism for Airport Time Slot Allocation," *Bell Journal of Economics* 13: 402-417.

M. H. Rothkopf, A. Pekec and R. M. Harstad (1998), "Computationally Manageable Combinatorial Auctions", *Management Science*, Vol. 44, No. 8, 1131-1147.

Rothkopf, Michael, Thomas Teisberg and Edward Kahn (1990), "Why Are Vickrey Auctions Rare?" *Journal of Political Economy*, 98: 94-109.

Sholtz & Associates, LLC, "ACE Market Operations Guide," Jan. 3, 1996, pp. 1-5.

Siegmann, "Nowhere to Go But Up. (Onsale CEO Jerry Kaplan) (PC Week Inside) (Inside People)"; PC Week; v12 n42; pA5 (1); Oct. 23, 1995; Dialog: File 148, Acc#08222496.

U.S. Department of the Treasury, U.S. Securities and Exchange Commission, and Board of Governors of the Federal Reserve System, *Joint Report on the Government Securities Market*, Washington, D.C.: U.S.G.P.O., January 1992.

Vickrey, William (1961), "Counterspeculation, Auctions and Competitive Sealed Tenders," *Journal of Finance*, March, 16(1), pp. 8-37.

Vickrey, William (1962), "Auctions and Bidding Games," Recent Advances in Game Theory, Princeton: Princeton University Conference, 1962, pp. 15-29.

Vickrey, William (1976), "Auctions, Markets, and Optimal Allocation," Bidding and Auctioning for Procurement and Allocation, New York: New York University Press 1976, pp. 13-20.

Weber, Robert J. (1983), "Multiple-Object Auctions," Auctions, Bidding, and Contracting: Uses and Theory, New York: New York University Press, 1983, pp. 165-191.

Weber, Robert J. (1997), "Making More from Less: Strategic Demand Reduction in the FCC Spectrum Auctions," *Journal of Economics and Management Strategy*, 6:529-548.

Williams, Steven (1999), "A Characterization of Efficient, Bayesian Incentive Compatible Mechanisms," *Economic Theory* 14: 155-180.

Wilson, Robert (1979), "Auctions of Shares," *Quarterly Journal of Economics*, vol. 94, 1979, pp. 675-689.

DETAILED DESCRIPTION OF PREFERRED EMBODIMENTS

Overall Structure of Auction System

Earlier auction methods and systems are described in U.S. Pat. Nos. 5,905,975, 6,021,398 and 6,026,383. The following description will detail the flow of the novel features of the preferred embodiments of the present method and system for an auction of multiple types of items.

Figure 1:
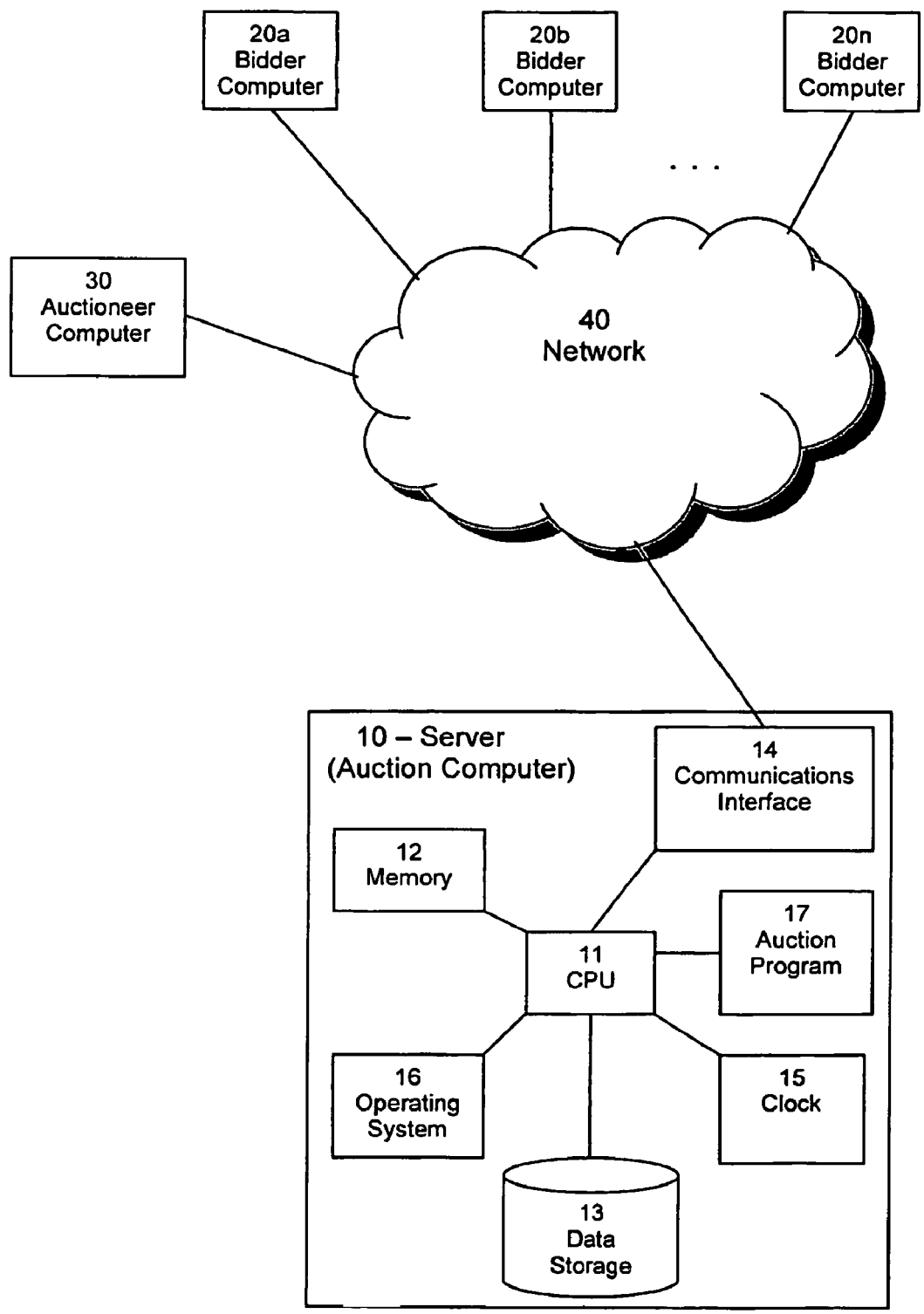
FIG. 1 is a graphical depiction of the architecture of an exemplary computer system in accordance with an embodiment of the invention.

Before describing the auction process in detail, reference is made to FIG. 1 to describe the architecture of an exemplary computer system in accordance with an embodiment of the present invention. In the graphical depiction of FIG. 1, the computer system consists of multiple bidder and auctioneer computers or terminals 20*a-n* and 30 communicating with the server (or auction computer) 10 over a network 40. The computers or terminals 20*a-n* are employed by bidders, the computer or terminal 30 is employed by the auctioneer, and the server 10 is the auction computer. The server 10 consists of a CPU 11, memory 12, a data storage device 13, a communications interface 14, a clock 15, an operating system 16, and an auction program 17. In one embodiment, the system architecture is as a client-server system: the auction computer is a server; and the bidder and auctioneer computers are clients.

Figure 2:
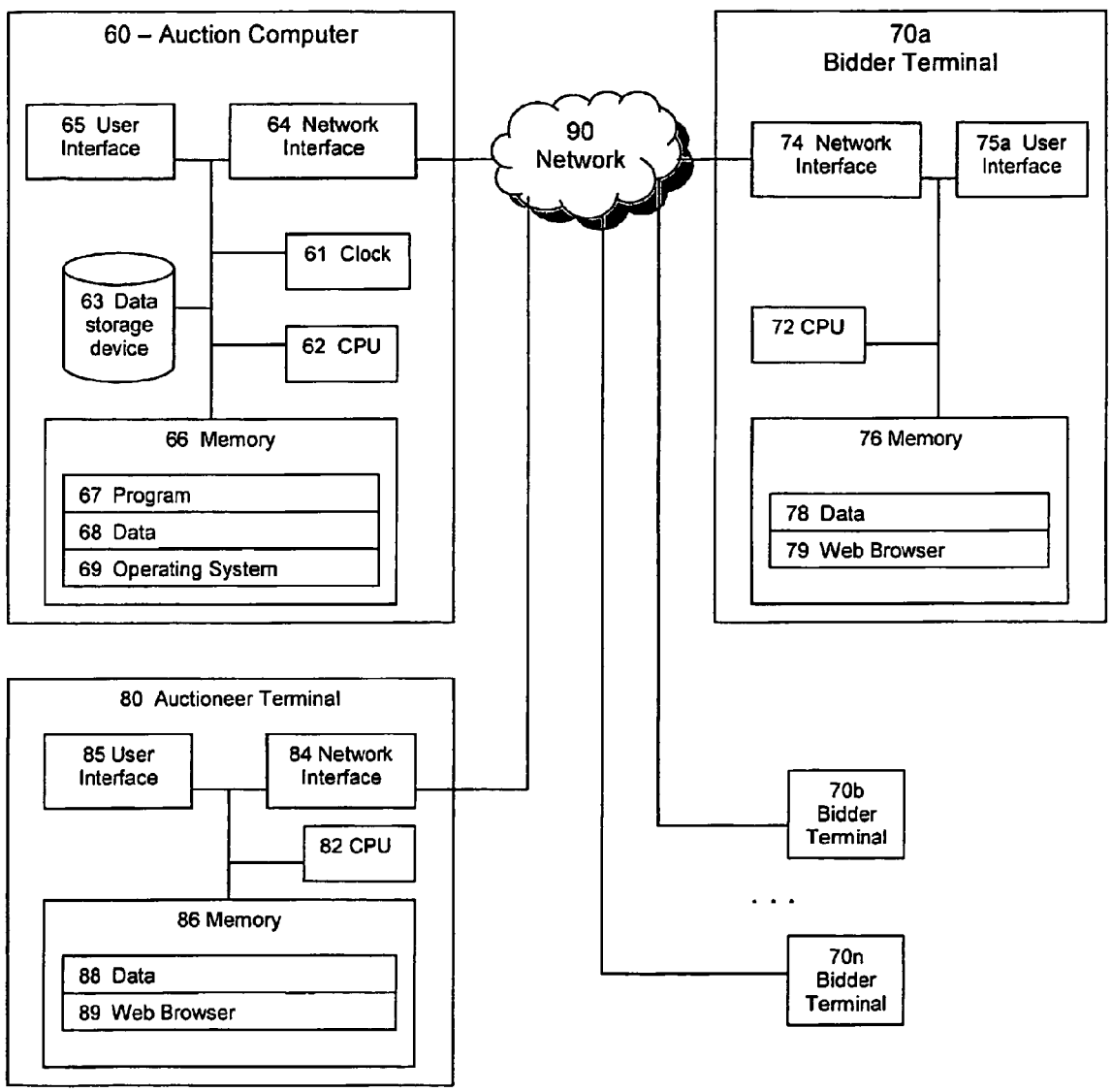
FIG. 2 is a graphical depiction of another exemplary computer system in accordance with an embodiment of the invention.

FIG. 2 is another graphical depiction of an exemplary computer system in accordance with an embodiment of the present invention. The auction system of FIG. 2 includes an auction computer 60 (sometimes also referred to as a Bidding Information Processor or BIP), a plurality of user systems 70*a*, 70*b* and so on (sometimes also referred to as Bidder Terminal or BT), each user system 70*a-n* representing an individual bidder, and a user system 80 (sometimes also referred to as an Auctioneer Terminal or AT). The systems 60, 70*a-n*, and 80 communicate over a network 90. The network represents any system capable of providing the necessary communication to/from BIP, BT, and AT. The network may be a local or wide area network such as, for example, Ethernet, token ring, the Internet, the World Wide Web, the information superhighway, an intranet or a virtual private network, or alternatively a telephone system, either private or public, a facsimile system, an electronic mail system, or a wireless communications system. Each of the systems 60, 70*a-n*, and 80 may include a typical user interface 65, 75*a-n*, 85 for input/output which may include a conventional keyboard, display, and other input/output devices. Within each of the systems, the user interface (65, 75*a-n*, 85) is coupled to a network interface (64, 74*a-n*, 84), which in turn communicates via the network 90. Both the user interface and network interface connect, at each system, to a CPU (62, 72*a-n*, 82). Each system includes a memory (66, 76*a-n*, 86). The BIP 60 also includes a clock 61 and a data storage device 63, which will ordinarily contain a database. (However, in some embodiments the database might instead be stored in memory 66.) The memory 66 of the BIP 60 can further be broken down into a program 67, data 68 and an operating system 69. The memory (76*a-n*, 86) of the BT's 70*a-n* and the AT 80 may include a web browser (for example, Internet Explorer or Netscape) (79, 89) or other general-purpose software, but not necessarily any computer program specific to the auction process. In each system the CPU (62, 72*a-n*, 82) represents a source of intelligence when executing instructions from the memory (66, 76*a-n*, 86) so that appropriate input/output operations via the user interface and the network interface take place as is conventional in the art. The particular steps used in implementing the inventive auction system and method are described in more detail below. In one embodiment, each of the user systems is a personal computer or workstation.

Figure 3:
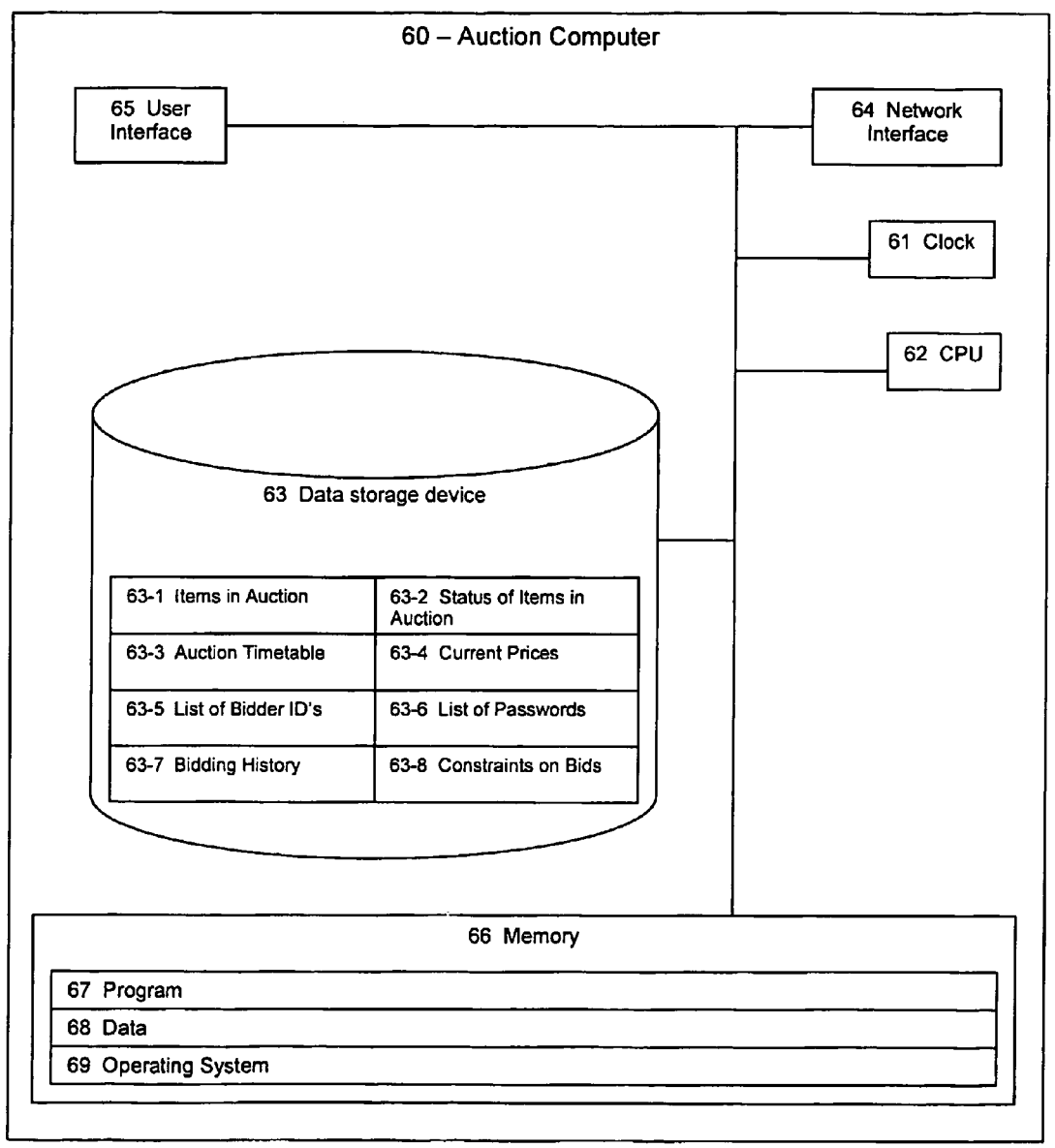
FIG. 3 is a detail of one element of the computer system of FIG. 2.

FIG. 3 is a more detailed illustration of an exemplary BIP 60 showing details of the database. As discussed for FIG. 2, the database is ordinarily stored on a data storage device 63, although in some embodiments it might instead be stored in memory 66. As depicted in FIG. 3, the database includes provision for creating, storing, and retrieving records representing Items in the Auction 63-1, Status of the Items in the Auction 63-2, Auction Timetable 63-3, Current Price(s) 63-4, List of Bidder ID's 63-5, List of Passwords 63-6, Bidding History 63-7, and Constraints on Bids 63-8. The particular set of data required for any particular auction and the format of that datum or data (such as scalar, vector, list, etc.) is more particularly specified by the detailed description of that auction.

Definitions Concerning "Types" of Items and "Groups" of Types of Items

Many of the most useful embodiments of the present invention apply in situations where an entity wishes to sell or buy multiple "types" of items or commodities. Furthermore, related types of items may be usefully organized as "groups" of items. In order to describe the preferred embodiments, it will be helpful for us to define some terminology.

DEFINITION 1: A type of item comprises a (nonempty) subset of the set of all items being auctioned, such that any two items within the same type are identical items or close substitutes. Meanwhile, types are defined so that any two items of different types exhibit significant differences in time, location or any other product characteristics. Typically, there are multiple units of each type of item.

In what follows, we will assume that m ($m \geq 1$) types of items are being auctioned, and that there are n ($n \geq 1$) bidders participating in the auction. Whenever we state that there is a "plurality of types of items," we are restricting attention to the case where $m \geq 2$. The items in the auction may also be said to be "homogeneous" in the case where m=1 and to be "heterogeneous" in the case where $m \geq 2$. Whenever we state that there is a "plurality of bidders," we are restricting attention to the case where $n \geq 2$.

DEFINITION 2: A group G of types comprises a (nonempty) subset of $\{1, \ldots, m\}$, the set of all types of items. In other words, a group is one or more types of items that are usefully treated together. Typically, the reason that two types of items are included in the same group is that they are related, for example, they may be contracts for provision of the same commodity, covering different but overlapping time periods.

In what follows, we will assume that the items in the auction are organized so that there are h ($h \geq 1$) groups of types of items. There is no requirement that each group contains the same number of types of items, but this often happens to be the case. Whenever we need notation indicating the number of types of items contained in the exemplary group G, our notation will be that there are g ($g \geq 1$) types of items in group G. In some of the preferred embodiments of the present invention, the prices for the various types of items within the same group are established so as to maintain a relationship according to a schedule. In others of the preferred embodiments of the present invention, a bidder submits a bid that includes the price for one type of item within a group, and a fixed relation among these prices implies the prices of the other types of item within the same group. In others of the preferred embodiments of the present invention, a bidder submits a bid that includes a one-dimensional price parameter, and this price parameter implies prices for all of the types of items within the group based on a fixed relation among the prices of the types of items.

Some examples of "types" and "groups," in situations where there may be significant commercial possibilities for embodiments of the present invention, include the following:

Treasury bills or other securities: A government or central bank may wish to auction 3-month, 6-month and 12-month Treasury securities (for example, with the same starting date) together. Thus, there is one group of types of items (h=1), and it contains three types of items (g=3). In total, there are three types of items (m=3).

Electricity contracts: An electric generating company may wish to simultaneously auction some forward contracts or options contracts for base-load and peak-load electricity generation, with durations of 2 months, 3 months, 6 months, 12 months, 24 months and 36 months, respectively. Thus, there are two groups of types of items (h=2), each containing six types of items (g=6). In total there are 2×6=12 types of items (m=12).

Two unrelated, heterogeneous consumer commodities (e.g., apples and oranges). There are two groups of types of items (h=2), each containing just one type of item (g=1), for a total of two types of items (m=2).

An auction in accordance with an embodiment of the present invention proceeds as follows. First, the auctioneer (i.e., the auctioneer terminal) determines a starting price vector, $(P_1, \ldots, P_m)$, and transmits it to the bidding information processor, which in turn transmits it to bidders (i.e., bidder terminals). Second, a bidder responds with a bid vector indicating the quantity of each respective type of item that the bidder wishes to transact at the current price vector. Let the bidders be superscripted by i, where (i=1, . . . , n). The bid vector for bidder i is denoted by $(Q_1^i, \ldots, Q_m^i)$. The following definitions are helpful in describing the process associated with a first embodiment of the present invention.

Other Definitions.

The available quantities may, in principle, be specified for each group of types of items or for each type of items. In the text that follows, we will usually specify the available quantity for the group. The available quantity for group G will be denoted $\overline{Q}^G$ and this refers, in the case of an auction to sell, to the overall quantity of items in group G to be offered for sale in the auction or, in the case of an auction to buy (i.e., a procurement auction or a "reverse auction"), to the overall quantity of items in group G to be bought in the auction. The vector of available quantities for all groups will be denoted $(\overline{Q}^1, \ldots, \overline{Q}^h)$ Optionally, the available quantities may be allowed to depend on the prices, or otherwise be contingent on the progress of the auction.

The current prices comprise a vector, $(P_1, \ldots, P_m)$, whose components represent the prices for the m respective types of items.

The current bid of bidder i comprises a vector, $(Q_1^i, \ldots, Q_m^i)$, whose components represent the quantities that bidder i is willing to buy (in the case of an auction to sell) or to sell (in the case of an auction to buy) at the current prices for the m respective types of items.

The current bids comprise the collection of vectors, $\{Q_1^i, \ldots, Q_m^i\}_{i=1}^n$ consisting of the current bid of bidder i for every bidder (i=1 . . . , n) in the auction.

The bidding history comprises the current prices and the current bids associated with the present time and all earlier times in the current auction.

A clock auction is a dynamic auction procedure whereby: the auctioneer announces the current prices to bidders; the bidders respond with current bids; the auctioneer determines whether the auction should continue based on the bidding history; the auctioneer updates the current prices based on the bidding history and the process repeats, if it is determined that the auction should continue; and the auctioneer allocates the items among the bidders and assesses payments among the bidders based on the bidding history, if it is determined that the auction should not continue.

Observe that a "clock auction" differs from a standard ascending-bid electronic auction in the following important sense. In standard ascending-bid electronic auctions—such as in the Federal Communications Commission auctions for radio communications spectrum or in eBay auctions—the bidders name prices (and, perhaps also, quantities) that they propose to pay for the items being auctioned, in an iterative process. In a standard clock auction, the auctioneer sets the pace for price increases, and bidders respond only with quantities in an iterative process. (however, in the discussion of Intra-Round Bids, below, it will be seen that there still may be a role for bidders naming prices—to a limited extent—in a clock auction.)

Figure 4:
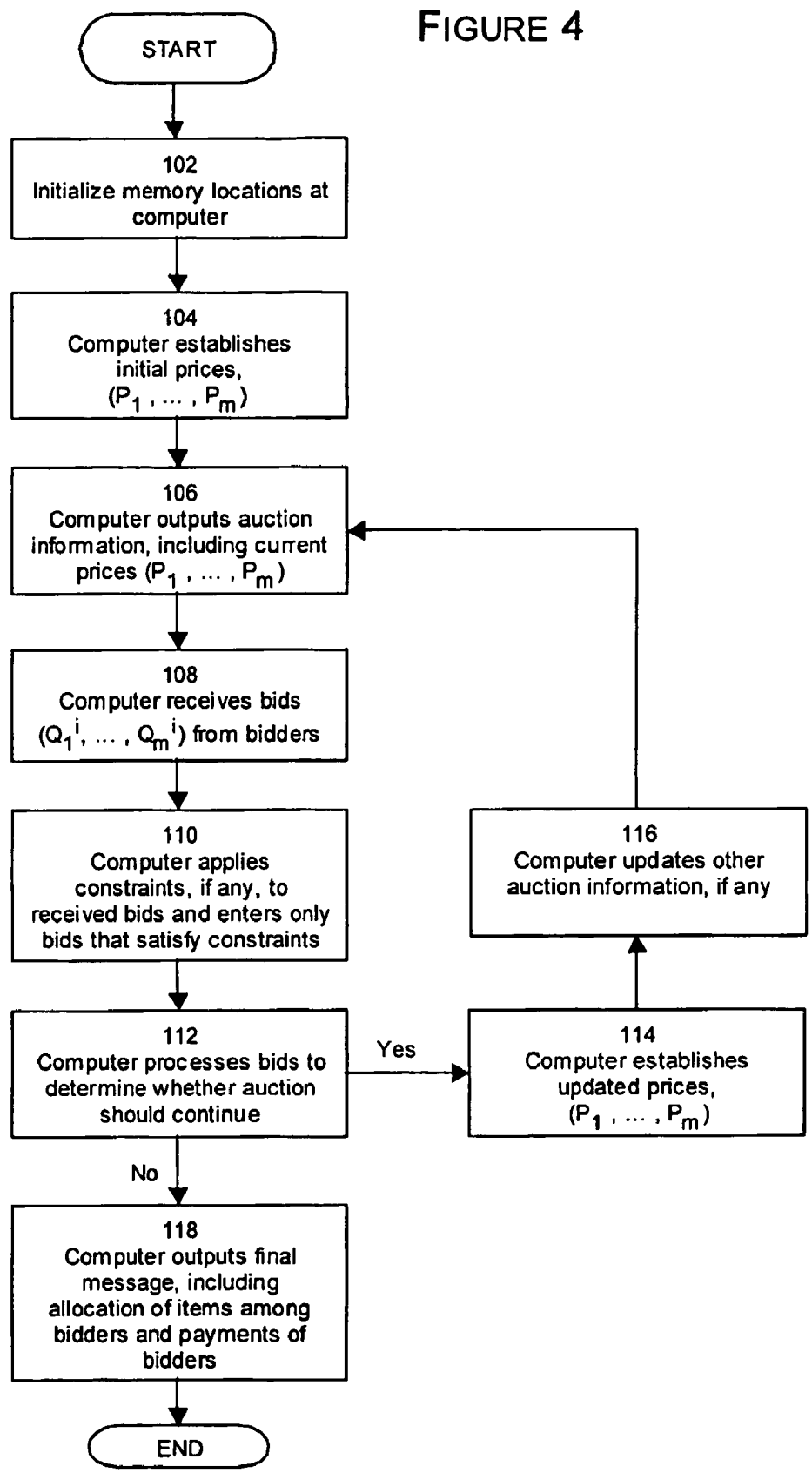
FIG. 4 is a flow diagram of an exemplary auction process in accordance with one embodiment of the invention.

FIG. 4 is a flow diagram of a clock auction in accordance with one embodiment of the present invention. The process starts with step 102, in which memory locations of a computer are initialized. In one preferred embodiment, the appropriate memory locations of the bidding information processor (auction computer) are initialized with information such as the types of items in the auction, the available quantity of each type of item in the auction, the data table or algorithm reflecting the "yield curve" schedule, an initial price parameter, an auction timetable, a list of bidder ID's, and a list of passwords. In step 104, a computer establishes the initial prices $(P_1, \ldots, P_m)$. One preferred embodiment of the process of step 104 is shown in greater detail in FIG. 5b. The process proceeds to step 106, in which a computer outputs auction information, including the current price vector $(P_1, \ldots, P_m)$. In one preferred embodiment, the bidding information processor outputs the auction information through its network interface and transmits it via the network. The bidder terminals then receive the auction information through their network interfaces and display the information to bidders through their user interfaces. In step 108, a computer receives bids $(Q_1^i, \ldots, Q_m^i)$ from bidders. In one preferred embodiment, a bidder inputs his bids through the user interface of the bidder terminal, which then outputs the auction information through its network interface and transmits it via the network. The bidding information processor then receives the bids through its network interface for use in the next step. One preferred embodiment of the process of step 108, utilizing Intra-Round Bids, is shown in greater detail in FIG. 8a. In step 110, a computer applies constraints, if any, to the received bids, and enters only those bids that satisfy said constraints. This process is illustrated in greater detail in FIGS. 6a and 6b. In one preferred embodiment, the constraints are applied at the bidding information processor, although they may also easily be applied at the bidder terminals. In step 112, a computer processes the received bids and determines whether the auction should continue. Exemplary processes of step 112 are illustrated in greater detail in FIGS. 7 and 8b. In some preferred embodiments, this determination occurs at the bidding information processor.

If the auction should continue, the process goes to step 114, in which a computer establishes an updated price vector $(P_1, \ldots, P_m)$. One preferred embodiment of the process of step 114 is shown in greater detail in FIG. 5a. Then, at step 116, a computer updates other auction information, if any. In one preferred embodiment, the bidding information processor automatically generates a suggested revised price vector, outputs the suggested revised price vector through its network interface, and transmits it via the network. The auctioneer terminal then receives the suggested revised price vector through its network interface and displays it to the auctioneer through its user interface. The auctioneer either approves or modifies the revised price vector through the user interface of the auctioneer terminal, which then outputs the revised price vector through its network interface and transmits it via the network. The bidding information processor then receives the revised price vector through its network interface for use in subsequent steps. The process then loops to step 106.

If the auction should not continue, the process goes to step 118, in which a computer outputs a final message, including the allocation of items among bidders and the payments of the bidders. In one preferred embodiment, the bidding information processor takes the allocation of items among bidders to be their final bids and takes the payment of each bidder i to be the dot product of the final price vector and bidder i's final quantity vector:

$$(P_1, \ldots, P_m \cdot (Q_1^i, \ldots, Q_m^i)).$$

The bidding information processor outputs the allocation and payment outcome through its network interface and transmits it via the network. The bidder terminals and auctioneer terminal then receive the allocation and payment outcome through their network interfaces and display the information to bidders and the auctioneer through their user interfaces. One preferred embodiment of the process of step 118, utilizing Intra-Round Bids, is shown in greater detail in FIG. 8c. The process then ends.

Embodiments of the Invention Concerned with Establishing or Implying Prices

Figure 5A:
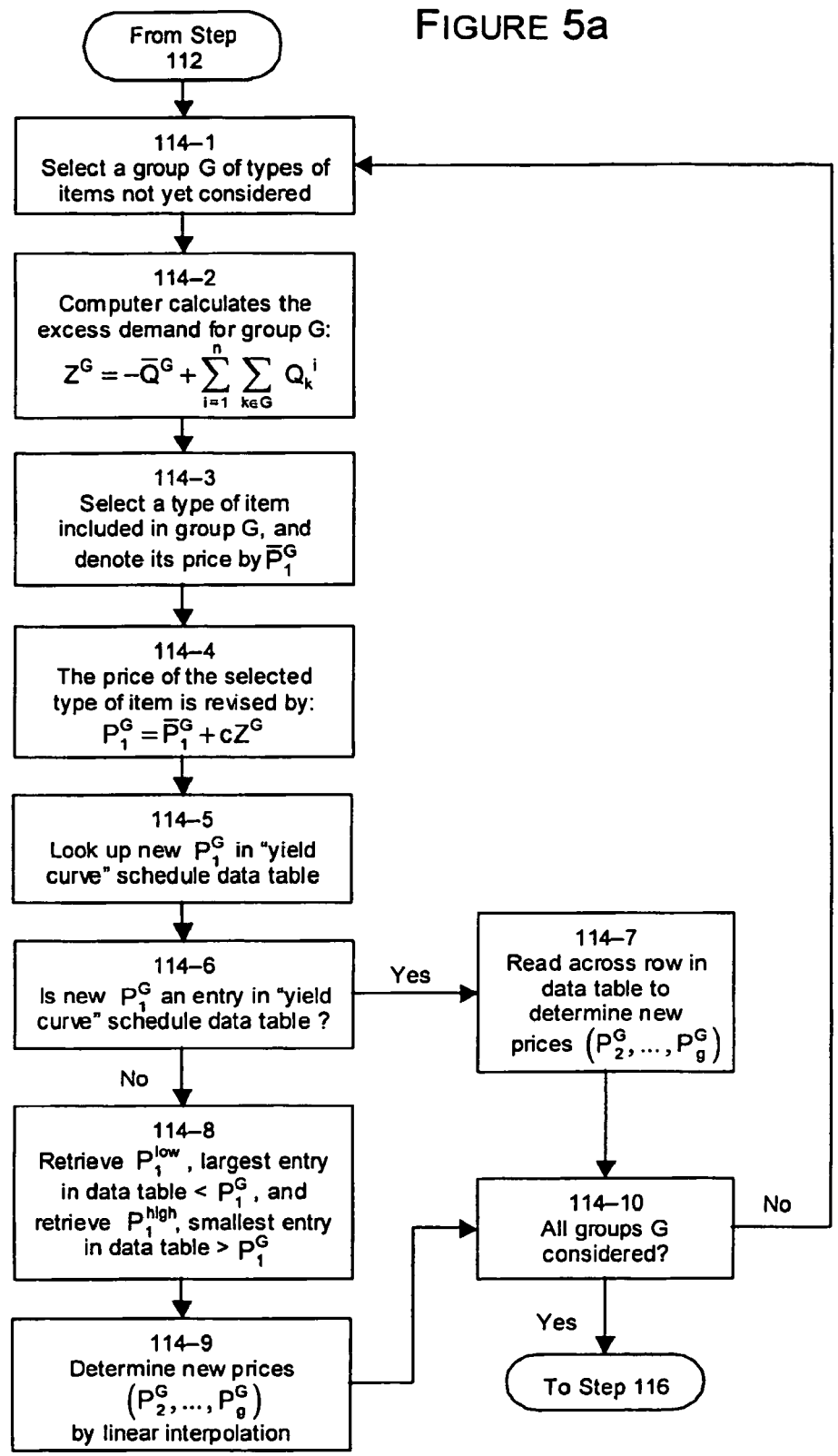
FIGS. 5a and 5b are flow diagrams illustrating, in greater detail, elements of the flow diagram of FIG. 4.

FIG. 5a is a flow diagram illustrating an exemplary process by which updated prices are established. Thus, FIG. 5a illustrates, in greater detail, step 114 of FIG. 4. The process begins with step 114-1, in which a computer selects a group G of types of items not yet considered. In step 114-2, a computer calculates the excess demand $Z^G$ for group G, which is given by:

$$Z^G = -\overline{Q}^G + \sum_{i=1}^{n} \sum_{k \in G} Q_k^i.$$

Thus, $Z^G$ represents the amount by which the bids for all types of items in group G, by all bidders, exceeds the available quantity $\overline{Q}^G$ of all items in group G. In step 114-3, a computer selects a type of item included in group G, whose "old" price is denoted by $\overline{P}_1^G$. In step 114-4, a computer sets a "new" price $P_1^G$, where $P_1^G$ equals the $\overline{P}_1^G$ plus an increment $\Delta$. The increment $\Delta$ is given by $\Delta = c Z^G$, where c is a positive constant and $Z^G$ was computed in step 114-2. (In other embodiments, other rules for incrementing $P_1$ are used.) In step 114-5, a computer looks up the new $P_1^G$ in a data table reflecting the "yield curve" schedule. The following Table 1 is an example of such a data table for a group G containing three types of items (corresponding to the base group of the earlier example containing base and peak groups of electricity contracts):

TABLE 1

| $P_1^G$ | $P_2^G$ | $P_3^G$ |
|---|---|---|
| 0.00 | 2.00 | 3.00 |
| 5.00 | 7.00 | 8.00 |
| 10.00 | 12.00 | 13.00 |
| 15.00 | 17.00 | 18.00 |
| 20.00 | 22.00 | 23.00 |

The process continues with step 114-6 in which a computer determines whether the new $P_1^G$ is an entry in the data table. If it is, the process continues with step 114-7 in which a computer reads across the row for the new $P_1^G$ in the data table and thereby determines the new prices $(P_2^G, \ldots, P_g^G)$, where g denotes the number of types of items within group G.

For example, with the data of Table 1, if $P_1^G$ equaled 15.00, then the computer would determine "Yes" at step 114-6, and the computer would determine $P_2^G = 17.00$ and $P_3^G = 18.00$ at step 114-7. The process then proceeds to step 114-10.

If the new $P_1^G$ is not an entry in the data table, the process continues with step 114-8, in which a computer retrieves $P_1^{low}$, the largest entry in the data table less than $P_1^G$, and a computer retrieves $P_1^{high}$, the smallest entry in the data table greater than $P_1^G$. The process then continues with step 114-9, in which a computer determines the new prices $(P_2^G, \ldots, P_g^G)$ by linear interpolation, reading across the rows in the data table corresponding to $P_1^{low}$ and $P_1^{high}$, and applying the new $P_1^G$. For example, with the data of Table 1, if $P_1^G$ equaled 10.50, then the computer would determine "No" at step 114-6. The computer would then retrieve $P_1^{low} = 10.00$ and $P_1^{high} = 15.00$ at step 114-8, and the computer would determine $P_2^G = 12.50$ and $P_3^G = 13.50$ at step 114-9. The process then proceeds to step 114-10, in which a computer determines whether all groups G have been considered. If not, the process returns to step 114-1. However, if all groups G have been considered, then the entire step 114 has been completed, and the process continues with step 116 of FIG. 4.

Three observations should be made at this point. First, rather than determining prices by looking up and possibly interpolating of numbers that are contained in a data table, the relationship or relation among the prices may instead be an algorithm or a formula. For example, instead of using the data of Table 1, another preferred embodiment would be obtained by equivalently applying the formulae $P_2^G = P_1^G + 2$ and $P_3^G = P_1^G + 3$. Second, there is no particular reason that the relationship or relation among the prices need be linear, as it happens to be in Table 1 and in some applications. The relationship or relation (data table, or algorithm or formula) could be a nonlinear relationship between $(P_2^G, \ldots, P_g^G)$ and $P_1^G$. Third, in some embodiments, the relationship or relation (whether schedule or data table, or algorithm or formula) among prices is predetermined and fixed, and in other embodiments, the relationship or relation can be based on data which may be revised during the course of the auction. In typical applications, the price relationship or relation may be determined from market data external to the auction, for example, from the "yield curve" in the government securities market, expressing the differential among prices or interest rates for securities of varying durations. If the market data external to the auction were to markedly change during the course of the auction, then the auctioneer might wish to revise the price relationship or relation accordingly.

Figure 5B:
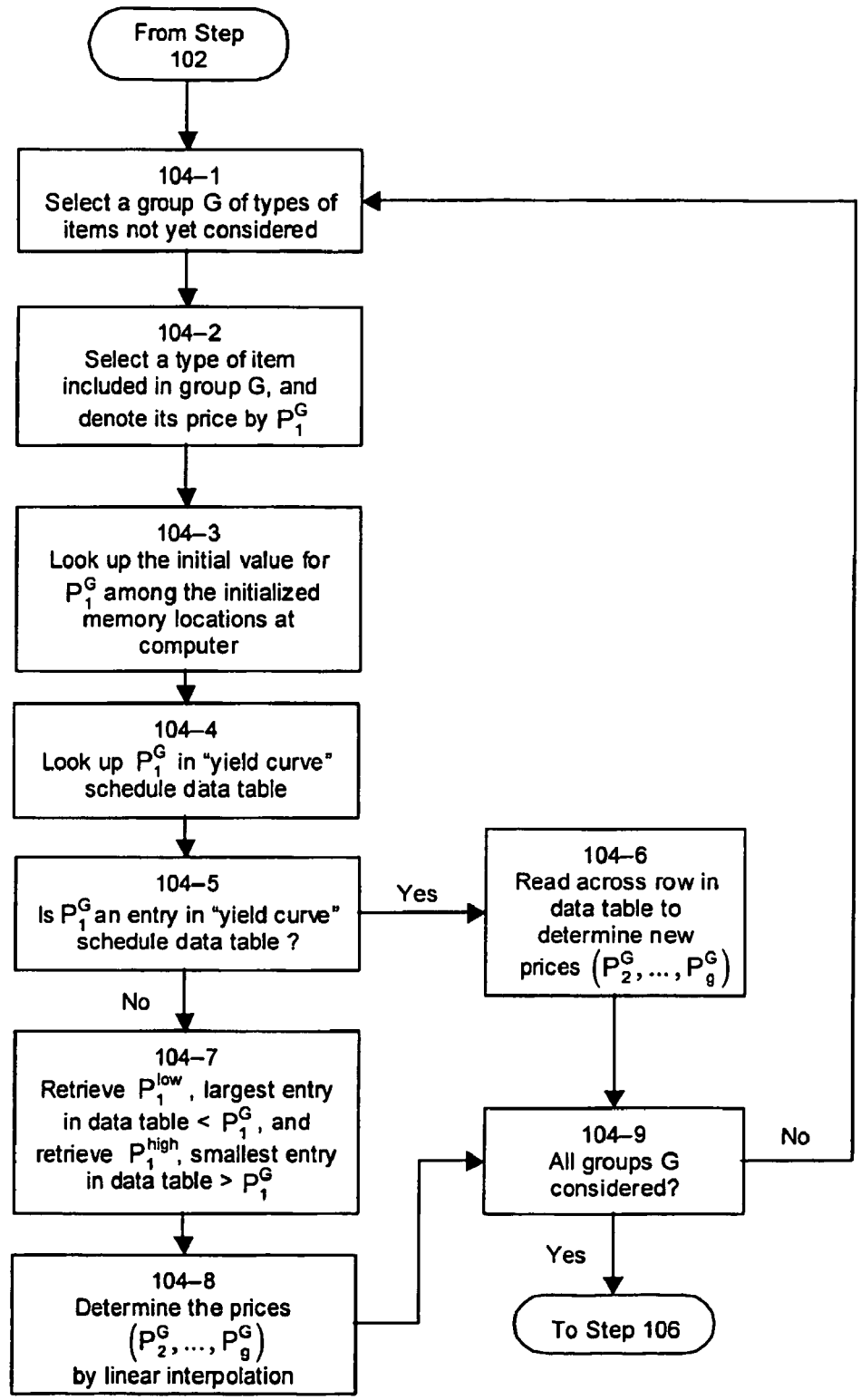

FIG. 5b is a flow diagram illustrating an exemplary process by which initial prices are established. Thus, FIG. 5b illustrates, in greater detail, step 104 of FIG. 4. The process begins with step 104-1, in which a computer selects a group G of types of items not yet considered. In step 104-2, a computer selects a type of item included in group G, whose price is denoted by $P_1^G$. In step 104-3, a computer looks up the initial value for the selected type of item in group G among the memory locations that were initialized in step 102, and uses this value as the initial $P_1^G$. In step 104-4, a computer looks up the initial $P_1^G$ in a data table reflecting the "yield curve" schedule. The previous Table 1 serves as an example of such a data table, as in the description of FIG. 5a. The process continues with step 104-5 in which a computer determines whether the initial $P_1^G$ is an entry in the data table. If it is, the process continues with step 104-6 in which a computer reads across the row for the initial $P_1^G$ in the data table and thereby determines the initial prices $(P_2^G, \ldots, P_g^G)$, where g denotes the number of types of items within group G. The process then proceeds to step 104-9.

If the initial $P_1^G$ is not an entry in the data table, the process continues with step 104-7, in which a computer retrieves $P_1^{low}$, the largest entry in the data table less than $P_1^G$, and a computer retrieves $P_1^{high}$, the smallest entry in the data table greater than $P_1^G$. The process then continues with step 104-8, in which the computer determines the initial prices $(P_2^G, \ldots, P_g^G)$ by linear interpolation, reading across the rows in the data table corresponding to $P_1^{low}$ and $P_1^{high}$, and applying the initial $P_1^G$. The process then proceeds to step 104-9, in which a computer determines whether all groups G have been considered. If not, the process returns to step 104-1. However, if all groups G have been considered, then the entire step 104 has been completed, and the process continues with step 106 of FIG. 4. The first two observations made after FIG. 5a also apply to the process of FIG. 5b.

Elements of the Invention Concerned with Applying Constraints to Bids

Figure 6A:
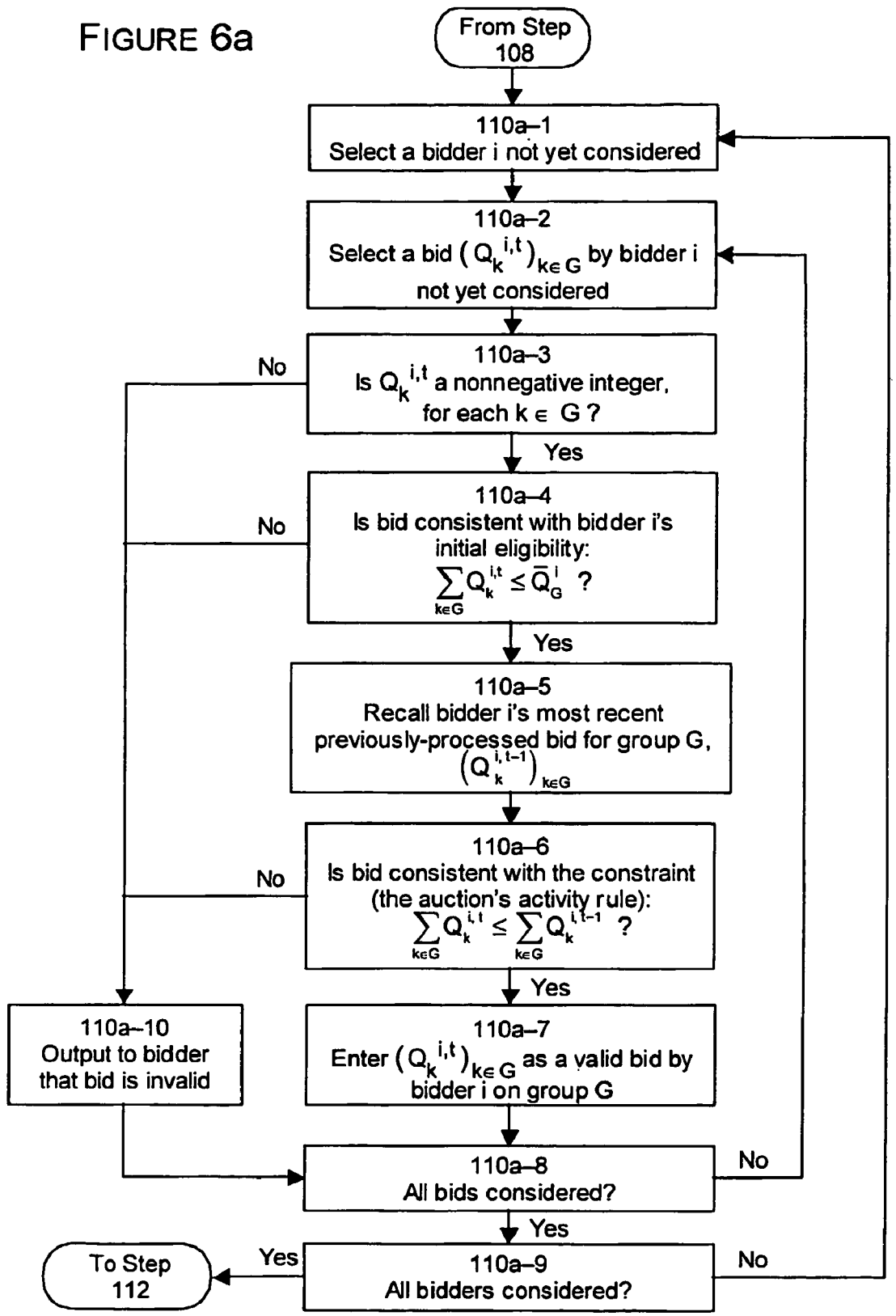
FIGS. 6a and 6b are flow diagrams illustrating, in greater detail, elements of the flow diagram of FIG. 4.
Figure 6B:
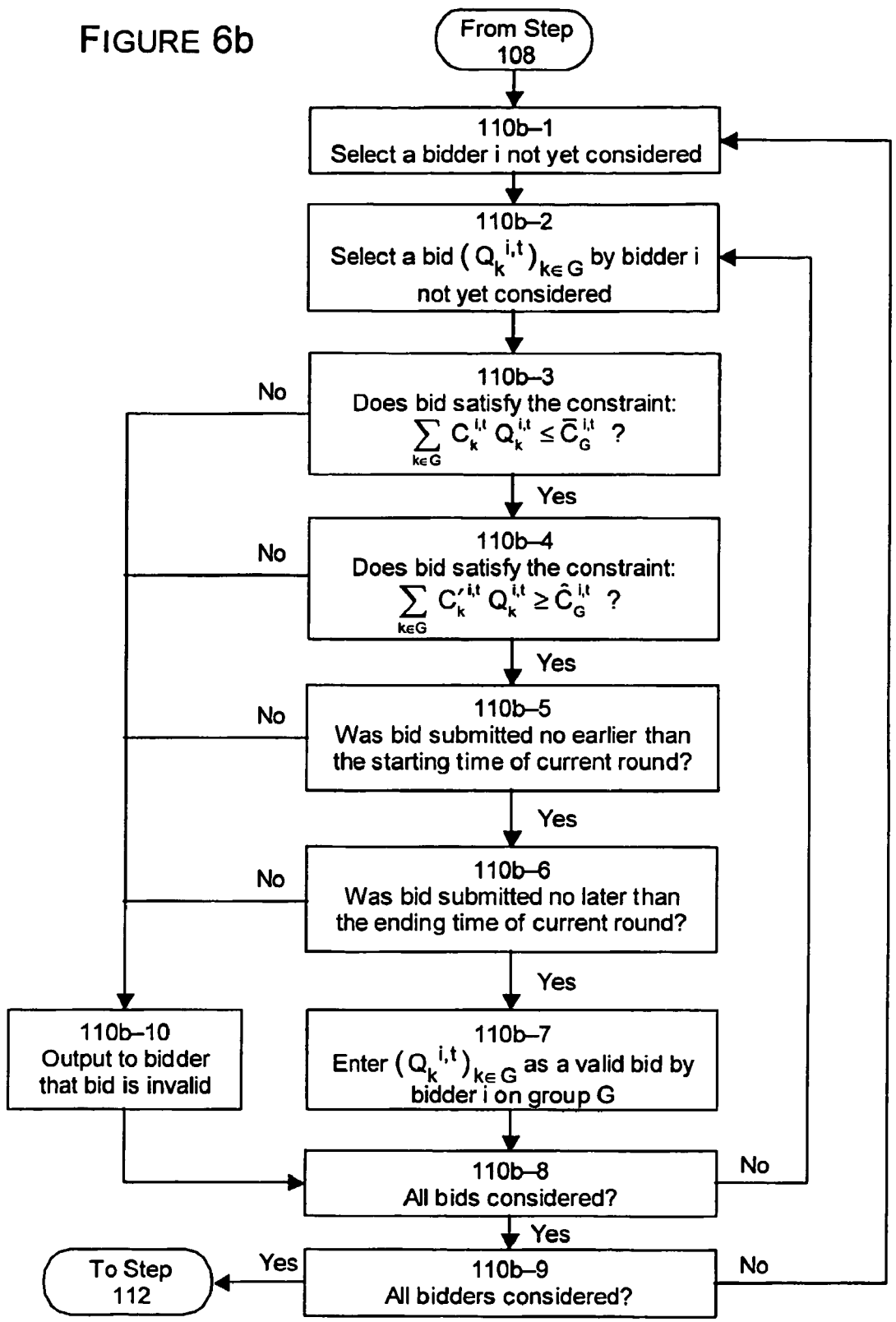

FIGS. 6a and 6b are flow diagrams of two exemplary subprocesses of step 110. The process of FIG. 6a begins with step 110a-1, in which a bidder i who has not yet been considered is selected. In step 110a-2, a bid $(Q_k^{i,t})_{k \in G}$ by bidder i which has not yet been considered is selected. The bid $(Q_k^{i,t})_{k \in G}$ is a bid for group G of item types at time t in the auction. In step 110a-3, it is checked whether each quantity $Q_k^{i,t}$ in the selected bid is a nonnegative integer. If each component of the bid is a nonnegative integer, the process goes to step 110a-4. In step 110a-4, it is checked whether the selected bid is consistent with bidder i's initial eligibility, that is, whether:

$$\sum_{k \in G} Q_k^{i,t} \leq \overline{Q}_G^i,$$

where bidder i's initial eligibility, $\overline{Q}_G^i$, for group G may, for example, be determined by the level of financial guarantee posted by bidder i. If the selected bid is consistent with bidder i's initial eligibility, the process goes to step 110a-5, where bidder i's most recent previously-processed bid for group G, denoted $(Q_k^{i,t-1})_{k \in G}$, is recalled. In step 110a-6, it is checked whether the selected bid is consistent with the auction's activity rule, that is, whether the constraint:

$$\sum_{k \in G} Q_k^{i,t} \leq \sum_{k \in G} Q_k^{i,t-1},$$

is satisfied. If it is, the process continues to step 110a-7, where the selected bid $(Q_k^{i,t})_{k \in G}$ is entered as a valid bid by bidder i on group G. Optionally, bidder i is sent a message confirming to him that the bid is valid. The process then goes to step 110a-8, where it is determined whether all bids by bidder i have been considered. If not, the process loops back to step 110a-2. If all bids by bidder i have been considered, the process continues to step 110a-9, where it is determined whether all bidders have been considered. If not, the process loops back to step 110a-1. If all bidders have been considered, the process goes to step 112 of FIG. 4.

If the selected bid fails any of the checks at steps 110a-3, 110a-4 or 110a-6, the process instead goes to step 110a-10, where a message is outputted to bidder i that the selected bid is invalid. The selected bid then is not entered as a valid bid.

The process then goes to step 110a-8, where it is determined whether all bids by bidder i have been considered. If not, the process loops back to step 110a-2. If all bids by bidder i have been considered, the process continues to step 110a-9, where it is determined whether all bidders have been considered. If not, the process loops back to step 110a-1. If all bidders have been considered, the process goes to step 112 of FIG. 4.

The process of FIG. 6b begins with step 110b-1, in which a bidder i who has not yet been considered is selected. In step 110b-2, a bid $(Q_k^{i,t})_{k \in G}$ by bidder i which has not yet been considered is selected. The bid $(Q_k^{i,t})_{k \in G}$ is a bid for group G of item types at time t in the auction. In step 110b-3, it is checked whether each quantity $Q_k^{i,t}$ in the selected bid satisfies the constraint:

$$\sum_{k \in G} C_k^{i,t} Q_k^{i,t} \leq \overline{C}_G^{i,t},$$

where $C_k^{i,t}$ and $\overline{C}_G^{i,t}$ are arbitrary constants. If the constraint of step 110b-3 is satisfied, the process goes to step 110b-4. In step 110b-4, it is checked whether each quantity $Q_k^{i,t}$ in the selected bid satisfies the constraint:

$$\sum_{k \in G} C'^{i,t}_k Q_k^{i,t} \geq \hat{C}_G^{i,t},$$

where $C'^{i,t}_k$ and $\hat{C}_G^{i,t}$ are arbitrary constants. If the constraint of step 110b-4 is satisfied, the process goes to step 110b-5, where it is checked whether the selected bid was submitted at a time no earlier than the starting time of the current round. If it was, the process goes to step 110b-6, where it is checked whether the selected bid was submitted at a time no later than the ending time of the current round. If it was, the process continues to step 110b-7, where the selected bid $(Q_k^{i,t})_{k \in G}$ is entered as a valid bid by bidder i on group G. Optionally, bidder i is sent a message confirming to him that the bid is valid. The process then goes to step 110b-8, where it is determined whether all bids by bidder i have been considered. If not, the process loops back to step 110b-2. If all bids by bidder i have been considered, the process continues to step 110b-9, where it is determined whether all bidders have been considered. If not, the process loops back to step 110b-1. If all bidders have been considered, the process goes to step 112 of FIG. 4.

If the selected bid fails any of the checks at steps 110b-3, 110b-4, 110b-5 or 110b-6, the process instead goes to step 110b-10, where a message is outputted to bidder i that the selected bid is invalid. The selected bid then is not entered as a valid bid. The process then goes to step 110b-8, where it is determined whether all bids by bidder i have been considered. If not, the process loops back to step 110b-2. If all bids by bidder i have been considered, the process continues to step 110b-9, where it is determined whether all bidders have been considered. If not, the process loops back to step 110b-1. If all bidders have been considered, the process goes to step 112 of FIG. 4.

Embodiments of the Invention Concerned with Whether the Auction Should Continue

Figure 7:
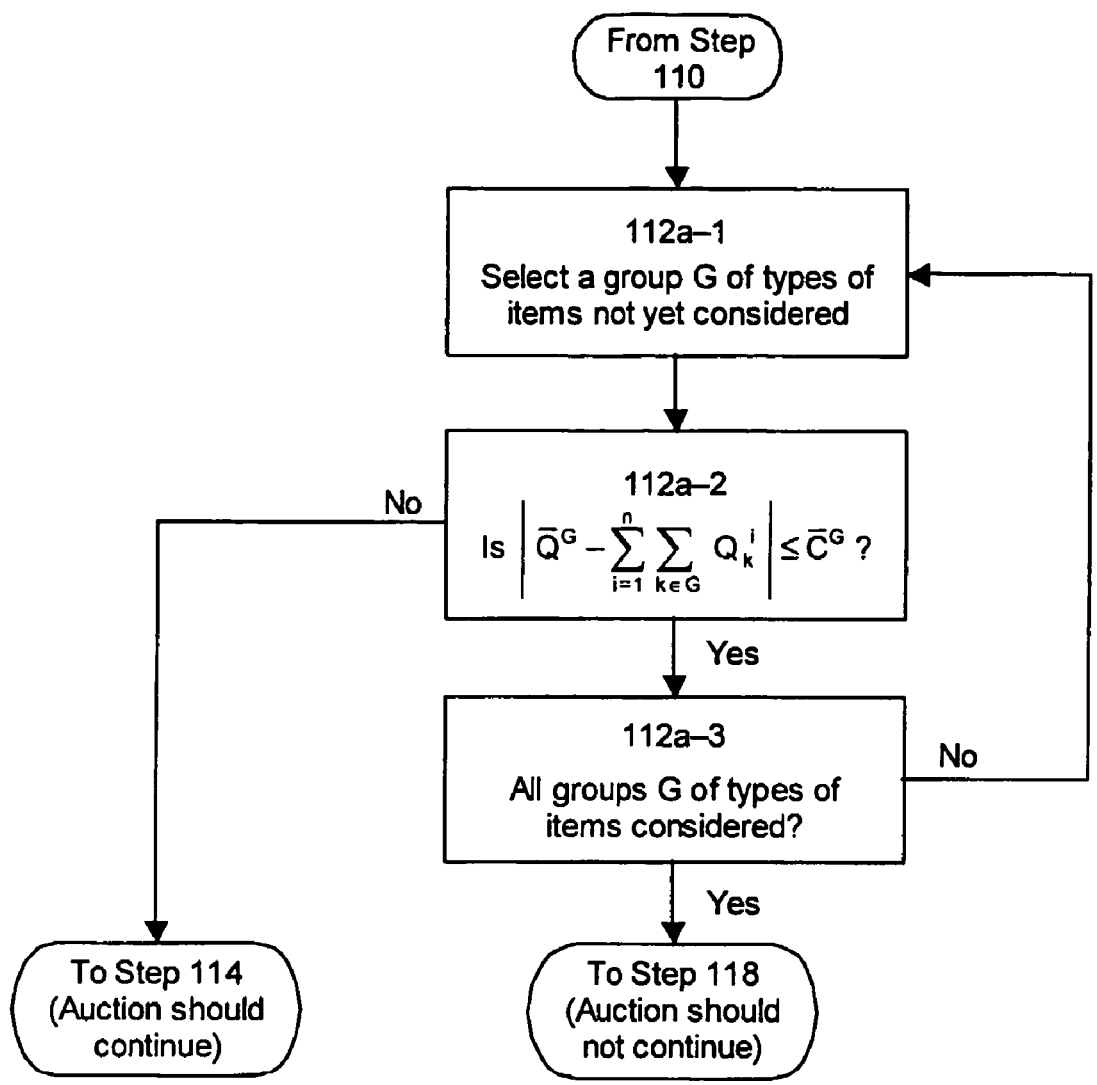
FIG. 7 is a flow diagram illustrating, in greater detail, an element of the flow diagram of FIG. 4.

FIG. 7 is a flow diagram of a subprocess of step 112 of FIG. 4. It illustrates an exemplary process by which a computer may determine whether the auction should continue. Related to this will also be FIG. 8*b*, below, which illustrates an exemplary process by which a computer determines whether the auction should continue, in a system where bidders are permitted to submit Intra-Round Bids. FIG. 7 begins with step 112*a*-1, in which a group G of types of items not yet considered is selected. In step 112*a*-2, a computer determines whether the excess demand for group G of types of items is within $\overline{C}^G$ of the available quantity, that is, whether:

$$\left| Q^G - \sum_{i=1}^{n} \cdot \sum_{k \in G} Q_k^i \right| \leq \overline{C}^G.$$

The constant, $\overline{C}^G$, has the interpretation that this is the tolerance to which the auctioneer is allowing oversell or undersell to occur. If the auctioneer needs to sell exactly the available quantity of the group G of item types, then $\overline{C}^G=0$. If this inequality is not satisfied, then group G of item types has not yet cleared, and so the auction should continue. The process thus jumps immediately to step 114 of FIG. 4.

If the inequality of step 112*a*-2 is satisfied, the process then goes to step 112*a*-3, where it is determined whether all groups G of types of items have been considered. If not, the process loops back to step 112*a*-1. However, if all groups G of types of items have already been considered, then it has been found that all groups G of types of items have cleared within a tolerance of $\overline{C}^G$, and so the auction should not continue. The process proceeds to step 118 of FIG. 4, where the final message is generated.

Embodiments of the Invention Concerned with Intra-Round Bids

In many of the leading dynamic electronic auctions in the prior art, bidders submit bids in a sequence of discrete rounds. For example, in the Federal Communications Commission auctions for radio communications spectrum or in the recent UMTS auctions held by European nations, the following would be a typical bidding schedule for an auction:

Round 1: 9:00-9:45
Round 2: 10:00-10:45
Round 3: 11:00-11:45
Round 4: 12:00-12:45
Round 5: 13:00-13:45
Round 6: 14:00-14:45
Round 7: 15:00-15:45
Round 8: 16:00-16:45

This bidding schedule would have the following interpretation. During the specified time period of each round, a bidder would be required to submit a new bid or new collection of bids (unless this bidder was already the standing high bidder on an item after the bidding of the previous round). If a bidder who was required to submit a new bid failed to submit a new bid, then (except for provisions in the rules concerning automatic waivers) the bidder would be eliminated from the auction.

By contrast, some other electronic auctions in the prior art—for example, online auctions at eBay—allow bidding to occur continuously. Rather than adhering to any rigid round schedule, bidders may submit bids at any times that they like up to a specified closing time. Related to this, there is no sense that a bidder is required to bid a certain amount by any particular time in order to retain eligibility to bid at a later time in the auction.

Many or most electronic auctions for high-valued items utilize a discrete round structure, rather than allowing bidding to occur continuously. There appear to be several reasons for this. First, a discrete round structure has desirable information properties. The auction can be easily structured so that the results of Round t are disseminated to bidders before the bids of Round t+1 need to be submitted. Second, a discrete round structure is especially conducive to enforcing "activity rules," in which a bidder is required to be active (i.e., either be the standing high bidder or place a new high bid) on a given number of items in an earlier round of the auction in order to continue to bid on a given number of items in a later round of the auction. This forces bidders to effectively disclose to their opponents (through their bidding) the values that they attach to the items, helping to mitigate the well-known "Winner's Curse" present in auctions. Third, a discrete round structure requires a bidder to repeatedly affirm, in successive rounds, his willingness to pay a given price for an item in the auction—which may be especially desirable when items such as communications licenses may sell for millions or billions of dollars or euros.

At the same time, the desirable properties of a discrete round structure may come at some considerable cost. It will typically be reasonable to hold only something like 8 to 12 rounds of bidding in a given day. As a result, the auctioneer must accept at least one of several problems:

(1) The auction may be required to last a very long time: in some North American and European spectrum auctions, the bidding extended more than 20 business days. Such a lengthy auction may be rather onerous for bidders and for the seller. In particular, it may discourage bidder participation, causing the seller to forgo substantial revenues.

(2) The bid increment between successive rounds may be required to be rather substantial: in some North American and European spectrum auctions, the bid increment between successive rounds never was allowed to drop below five percent of the previous bid. It can be argued that a seller suffers an expected revenue loss which is directly proportional to the minimum bid increment, so this may cost a seller millions of dollars or euros.

(3) The starting price may be required to be very near to the expected closing price. This may discourage bidder participation, as well as potentially eliminating the possibility of bidders getting caught up in the excitement of the auction and bidding very high prices (which is one of the advantages of conducting a dynamic auction). This also runs the risk that the auction will fail: that is, quantities bid at the starting price being less than the available quantity at the auction.

Moreover, in a clock auction, problem (2) above, a large bid increment, may lead to a heightened risk of "undersell". Consider an auction with an available quantity of 100 units of an item, and suppose a bid increment of five percent. It is quite plausible that, at a price of $1,000,000 per unit, the aggregate quantity bid by all bidders would equal 110 units, but at the next price of $1,050,000 per unit, the aggregate quantity bid by all bidders would decline to only 60 units. The auctioneer then faces the unattractive alternatives of: selling only 60 units out of the available quantity of 100 units at a price of $1,050,000 each; rationing bidders so that only 100 units, out of the 110 demanded, are sold at $1,000,000; or restarting the auction at $1,000,000. Observe however that the "undersell" problem would in all likelihood have been substantially avoided, had a much smaller bid increment been possible.

One embodiment of the present invention is a system and method for "Intra-Round Bids." A discrete round structure—with all of its many advantages—is preserved for a clock auction. However, in each round of the clock auction, a "starting price" and "ending price" is established for each type of item. Bidders are permitted to submit bids at prices between the starting price and the ending price. In a preferred embodiment, a bidder submits a price parameter for group G representing a percentage of the distance from the starting price vector for group G and the ending price vector for group G.

Bidders have every incentive to utilize Intra-Round Bids, and to the extent that bidders utilize them, the seller should be expected to attain higher auction revenues and to reduce the probability of undersell. Thus, a system and method for Intra-Round Bids improves upon the prior art for auction systems and methods, and has immediate practical application for dynamic auctions of radio communications spectrum, securities and other financial products, electric power, etc.

While the previous and following description of Intra-Round Bids is framed largely in terms of regular auctions to sell (where bidders are buyers), the invention is equally applicable for reverse or procurement auctions to buy (where bidders are sellers). For the sake of brevity, this specification will not run through the process a second time with the roles of selling and buying reversed, but it should be clear to anybody skilled in the art that the technology can be equally used in both situations.

Here is an example illustrating the usefulness and exact meaning of Intra-Round Bids. Suppose that, in a clock auction with an available quantity of 100 units, the ending price per unit associated with Round 4 is $1,000,000, and the ending price per unit associated with Round 5 is $1,050,000. In an auction with discrete bidding rounds, Bidder 1 might submit a bid quantity of 55 units for Round 4 and a bid quantity of 30 units for Round 5. If there also exists a Bidder 2 who submits the same bid quantities, then we would have exactly the "undersell" problem described above: an aggregate quantity bid by all bidders of 110 units in Round 4 but only 60 units in Round 5 (with available quantity of 100 units).

With an auction system and method with Intra-Round Bidding, the ending price for Round 4 may be taken to be the starting price for Round 5, i.e., the starting price for Round 5 is $1,000,000. Here is an example of the bids that Bidder 1 might submit for Auction Round 5:

53 units at $1,010,000 per unit;
51 units at $1,020,000 per unit;
49 units at $1,030,000 per unit;
45 units at $1,035,000 per unit;
40 units at $1,040,000 per unit; and
30 units at $1,045,000 per unit.

These bids have the following exact meaning: the parameters corresponding to price indicate the price at which Bidder 1 wishes to change his quantity demanded as compared to his "previous" (that is, next lower price) bid. Thus, in this example:

Bidder 1 is willing to purchase 55 units (his previous bid from Round 4) at prices of $1,000,001-$1,009,999;
Bidder 1 is willing to purchase 53 units at prices of $1,010,000-$1,019,999;
Bidder 1 is willing to purchase 51 units at prices of $1,020,000-$1,029,999;
Bidder 1 is willing to purchase 49 units at prices of $1,030,000-$1,034,999;
Bidder 1 is willing to purchase 45 units at prices of $1,035,000-$1,039,999;
Bidder 1 is willing to purchase 40 units at prices of $1,040,000-$1,044,999; and
Bidder 1 is willing to purchase 30 units at prices of $1,045,000-$1,050,000.

If there also exists a Bidder 2 who submits the same bid quantities, then the auctioneer would be able to declare the auction over at a price between $1,030,000 and $1,034,999, with 98 out of the 100 available units sold. The auction revenues are improved, and the undersell problem is greatly reduced.

Figure 8A:
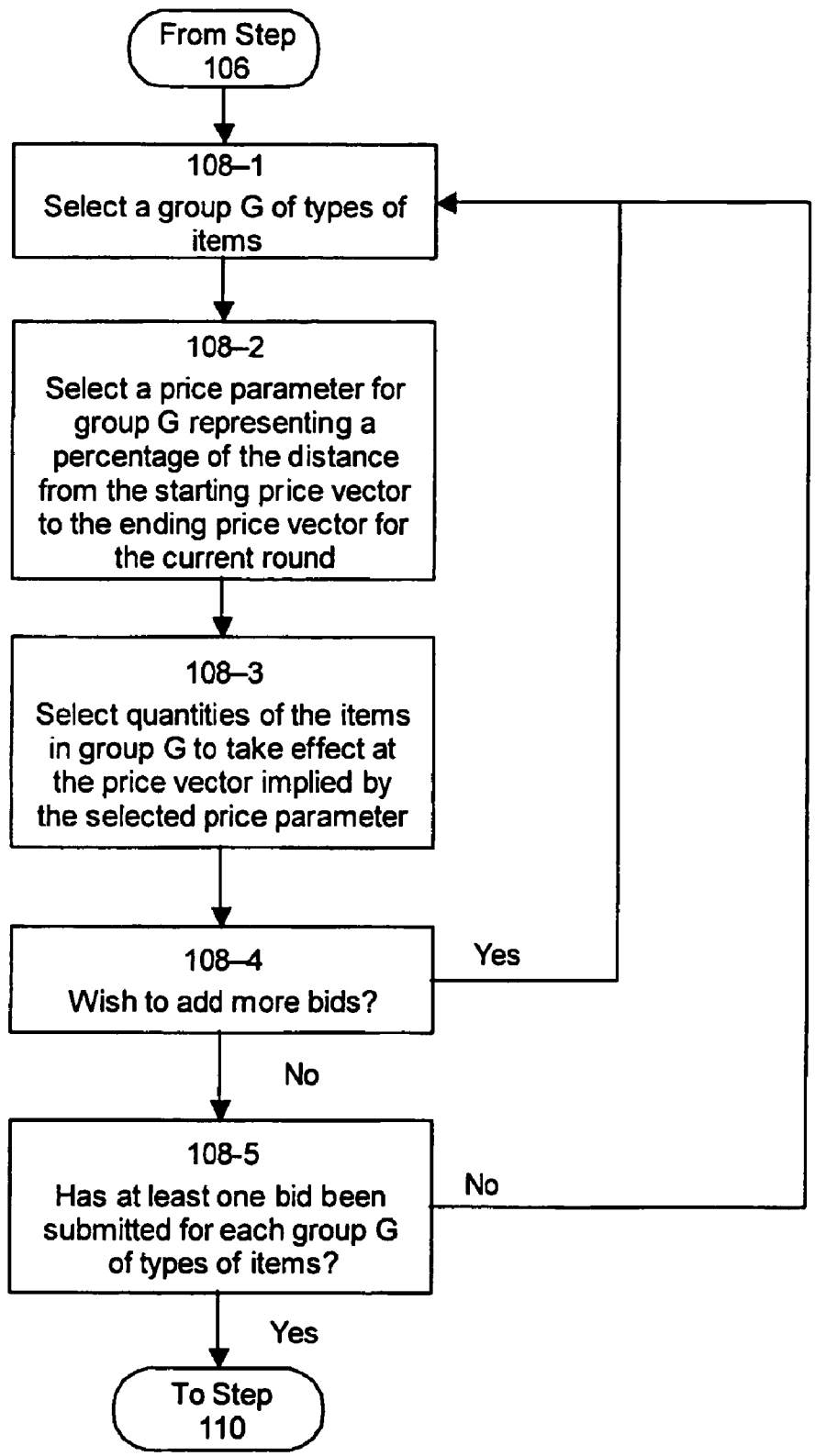
FIGS. 8a, 8b and 8c are flow diagrams illustrating, in greater detail, elements of the flow diagram of FIG. 4.

FIG. 8a is a flow diagram of a subprocess of step 108 of FIG. 4. It illustrates an exemplary process by which a particular bidder i may submit Intra-Round Bids. FIG. 8a begins with step 108-1, in which bidder i selects a group, G, of item types on which he wishes to place a bid. In step 108-2, bidder i selects a price parameter for group G representing a percentage of the distance from the starting price vector for group G and the ending price vector for group G in the current round. For example, in a group containing three types of items, if the starting price vector is (4.00, 4.50, 4.75), if the ending price vector is (8.00, 8.50, 8.75), and if a bidder enters a price parameter of 25%, this signifies that the bidder is indicating an implied price vector of (5.00, 5.50, 5.75). In step 108-3, bidder i selects quantities of the item types of group G that he would like to take effect as bids at the price vector implied by the selected price parameter. In step 108-4, bidder i expresses whether he wishes to enter more bids. If so, the process loops back to step 108-1. If not, the process continues to step 108-5. In step 108-5, a computer determines whether bidder i has submitted at least one bid for each group G of item types. If not, the process loops back to step 108-1, and optionally a computer prompts bidder i to submit bids on the groups G of item types on which bidder i has not submitted at least one valid bid in the current round. If so, the process goes to step 110 of FIG. 4.

Figure 8B:
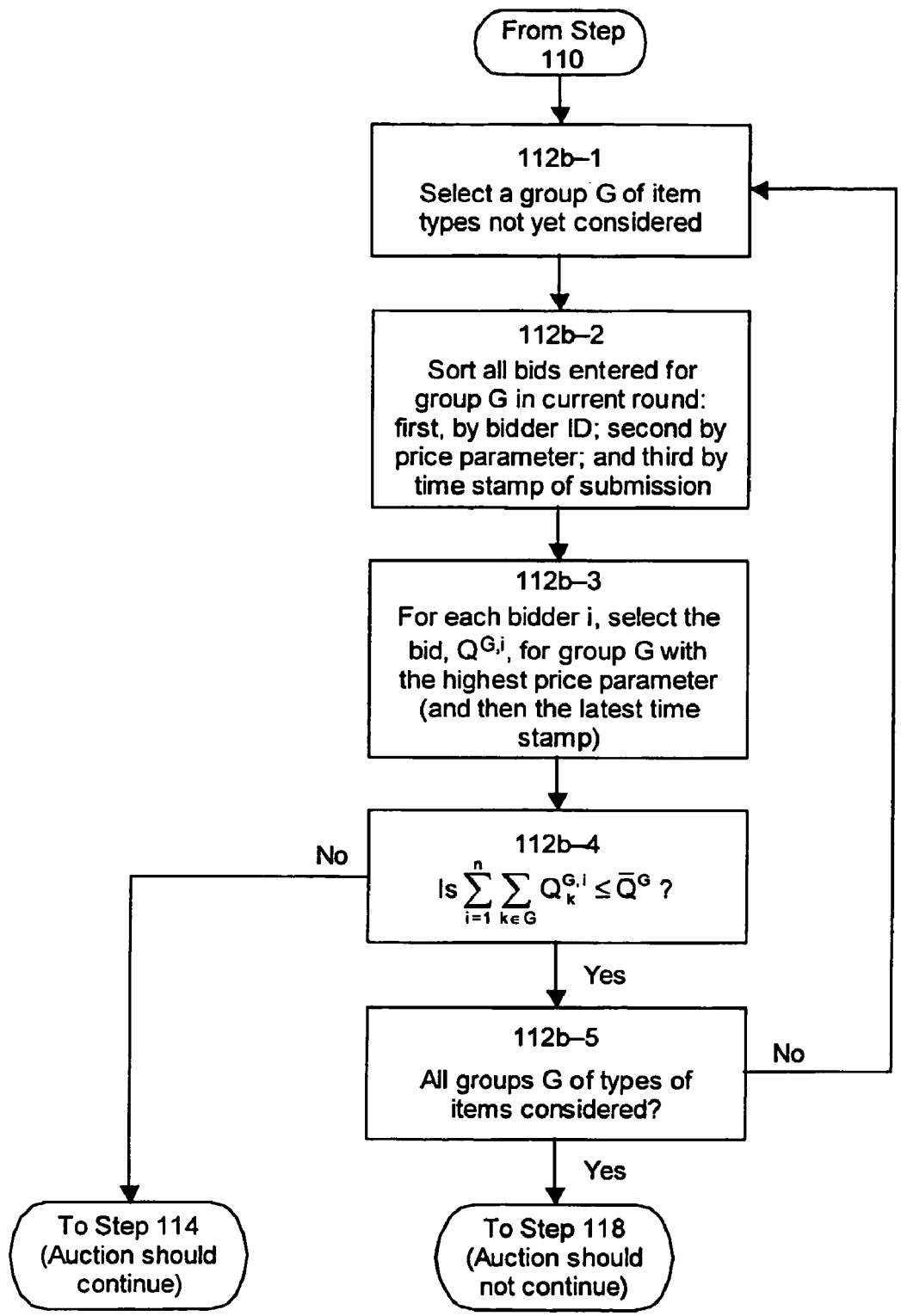

FIG. 8b is a flow diagram of a subprocess of step 112 of FIG. 4. It illustrates an exemplary process by which a computer determines whether the auction should continue, in a system where bidders are permitted to submit Intra-Round Bids. FIG. 8b begins with step 112b-1, in which a group G of item types not yet considered is selected. In step 112b-2, a computer sorts all bids entered for group G in the current round. The sorting is done: first, by bidder ID; second, by price parameter in the entered bid (in descending order); and third, by time stamp of submission (in descending order). In step 112b-3, a computer selects, for each bidder i, the bid, $Q^{G,i}$, for group G with the highest price parameter (and then the latest time stamp). In step 112b-4, a computer determines whether the aggregate quantity bid for group G is no greater than the available quantity, that is, whether:

$$\sum_{i=1}^{n} \sum_{k \in G} Q_k^{G,i} \le \overline{Q}^G.$$

If this inequality is not satisfied, then group G of item types has not yet cleared, and so the auction should continue. The process thus jumps immediately to step 114 of FIG. 4.

If the inequality of step 112b-4 is satisfied, the process then goes to step 112b-5, where it is determined whether all groups G of item types have been considered. If not, the process loops back to step 112b-1. However, if all groups G of item types have already been considered, then it has been found that all groups G of item types have cleared, and so the auction should not continue. The process proceeds to step 118 of FIG. 4, where the final message is generated.

Figure 8C:
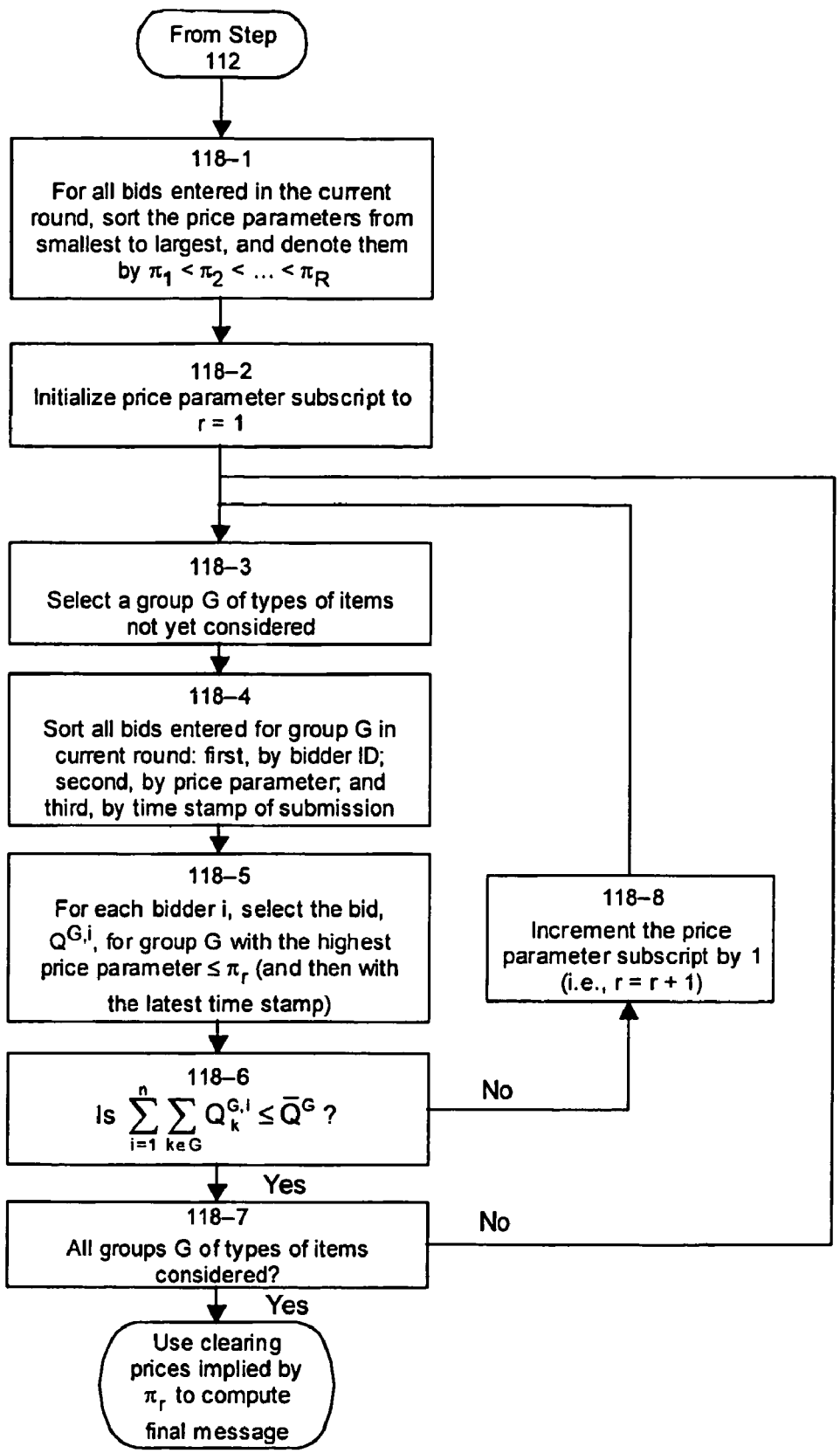

FIG. 8c is a flow diagram of a subprocess of step 118 of FIG. 4. It illustrates an exemplary process by which a computer determines final allocations and payments, in a system where bidders are permitted to submit Intra-Round Bids. FIG. 8c begins with step 118-1, in which for all bids entered in the current (i.e., final) round, a computer sorts the price parameters from smallest to largest, and denotes them $\pi_1 < \pi_2 < \ldots < \pi_R$. In step 118-2, a computer initializes the price parameter subscript to r=1, so that in the first iteration of the remaining steps, the computer considers the smallest value, $\pi_1$. In step 118-3, a group G of item types not yet considered is selected. In step 118-4, a computer sorts all bids entered for group G in the current round. The sorting is done: first, by bidder ID; second, by price parameter in the entered bid (in descending order); and third, by time stamp of submission (in descending order). In step 118-5, a computer selects, for each bidder i, the bid, $Q^{G,i}$, for group G with the highest price parameter that is less than or equal to $\pi_r$ (and then with the latest time stamp). In step 118-6, a computer determines whether the aggregate quantity bid for group G is no greater than the available quantity, that is, whether:

$$\sum_{i=1}^{n} \sum_{k \in G} Q_k^{G,i} \leq \overline{Q}^G.$$

If this inequality is not satisfied, then group G of item types has not yet cleared at price parameter $\pi_r$, and so r needs to be incremented. The process thus goes to step 118-8, where the price parameter subscript r is advanced by 1, so that in the next iteration of these steps, the computer considers the next price parameter, $\pi_{r+1}$. The process then loops back to step 118-3, using the new higher value of $\pi_{r+1}$ and starting over for groups G of item types.

If the inequality of step 118-6 is satisfied, the process continues to step 118-7, where it is determined whether all groups G of item types have been considered. If not, the process loops back to step 118-3. However, if all groups G of item types have already been considered, then it has been found that all groups G of item types have cleared at price parameter $\pi_r$. Thus, the price parameter $\pi_r$ implies market-clearing prices for the auction. The process proceeds to calculate the price vector implied by price parameter $\pi_r$, to note the quantities bid by all bidders at this price vector, and to incorporate these computations into a final message that is outputted from a machine.

Auction-Like Optimization Problems and Machine-Generated Bids

In the course of this application, a method and apparatus for implementing auctions of multiple items has been described. The methods and apparatus described allow users to participate in various auctions with a level of attention which varies from continuous, down to the input of information on a single occasion. It should also be apparent that the required level of attention by the "auctioneer" may vary from continuous to essentially zero—aside from initiating the auction. Thus, for all intents and purposes, once the basic auction description is selected and the users input desired information, the auction implemented by the invention can be essentially automatic, i.e. devoid of human interaction.

Because in the past auctions have generally been considered to be processes engaged in by persons, the feature of an automatic auction may be, by itself, considered relatively new. There are, however, many other automatic systems which interact in a way that is entirely analogous to an auction and to which the present invention could be applied. Hence, the present invention can be applied to improve the efficiency of computers which are used to operate the automatic systems, by economizing on the collection of informational inputs needed for the system and to speed the computational of optimal resource assignments. At the same time, many optimization problems encountered in the field of operations research have similar mathematical structures to the problem of determining the winners of an auction. Hence, the present invention can be applied to improve the efficiency of computer systems which are used to solve the similar optimization problems, by enabling the computations to be implemented on a system with parallel processing or generally by speeding the computation of solutions.

For example, the air conditioning plant in an office building allocates cool air among individual offices in the building via a dynamic auction. Periodically, the central computer of the air conditioning system serves the role of the "auction computer" in a clock auction, while computers interfaced with the thermostats in each suite of offices serve the role of "bidder terminals." Each thermostat is programmed to send back bids consisting of a desired quantity of cooled air based on: the current temperature reading of the thermostat, the desired temperature in the office, and the use (if any) to which the office is currently being put. Based on the parameters to which it has been programmed, the central computer of the air conditioning system then provides the results of the auction in its allocation of cooled air among the bidding offices.

In another context, a communications, transportation or energy transmission network faces the technical problem of how to allocate its scarce network resources. The optimization problem in allocating its network resources (e.g., bandwidth, switches, etc.) has a very similar structure to the auction problem. Moreover, clock auctions are again well suited to the problem, since a network provider needing multiple types of network resources is able to iteratively bid on a vector of network resources, always knowing the price of each. Hence, the present invention can be usefully applied to improving the solution to this technical problem.

In another context, computational resources on a distributed computer system can be allocated via a clock auction. Whenever a new job requiring a given quantity of CPU time enters the system, an auction is conducted. Each member of the distributed computer system indicates the quantity of CPU time which it can make available at a given priority level or a given price. In this case, the "auctioneer computer" selects and allocates the resources to be applied to the new job in accordance with some programmed timetable and hence in this fashion provides the results of the auction.

The several examples described herein are exemplary of the invention, whose scope is not limited thereby but rather is indicated in the attached claims.

What is claimed is:

1. A computer system for conducting an auction of at least one type of item among a plurality of bidders in a plurality of rounds, wherein bids are received and processed by the computer system, said system comprising:

establishing means for establishing a starting price, an ending price and a price range, said ending price different from said starting price, and said price range comprising prices between said starting and ending prices, for at least one type of item in a given round of the plurality of rounds, receiving means for receiving bids in the given round, wherein a bid comprises a quantity parameter indicating a quantity of at least one type of item and a price parameter indicating a price within the established price range, said price parameter dividing the established price range into a first interval comprising prices between the indicated price and the established starting price and a second interval comprising prices between the indicated price and the established ending price, processing means for processing the received bids, said processing means treating a bid with said quantity parameter and said price parameter from a given bidder as a proposal to transact the indicated quantity at a price within the second interval and as a proposal to transact another quantity at a price within the first interval, said another quantity based on at least one other bid in the auction by the given bidder, determining means for determining whether the auction should continue or end, based on the received bids, and initiating means for initiating an additional round, following a determination that the auction should continue.

2. A system as recited in claim 1 which further comprises means for constraining the changes in a bid from a given bidder in an additional round by considering, in the processing means, only bids which satisfy a constraint enforced by the means for constraining.

3. The computer system as recited in claim 1 wherein the quantity parameter of a bid is capable of indicating a quantity other than a quantity of zero and a quantity of unity.

4. The computer system as recited in claim 3 for conducting an auction of a plurality of types of items among a plurality of bidders in a plurality of rounds, wherein bids are received and processed by the computer system, wherein:

said establishing means establishes starting prices, ending prices and price ranges for a plurality of types of items in a plurality of rounds.

5. A system as recited in claim 4 which further comprises means for constraining the changes in a bid from a given bidder in an additional round by considering, in the processing means, only bids which satisfy a constraint enforced by the means for constraining.

6. A system as recited in claim 5 wherein the constraining means includes summation means for calculating a sum of quantities bid for a group of types of items.

7. A system as recited in claim 6 wherein the constraining means includes comparing means for comparing the calculated sum with a previous calculated sum for the same group of types of items.

8. A system as recited in claim 4 which further comprises:

constraining means for constraining bids for a set of types of items received from the given bidder within the given round, said constraining means limiting a sum of the indicated quantities of second bids to be no greater than a sum of the indicated quantities of first bids, in the event that the indicated prices of the second bids are between the indicated prices of the first bids and the established ending prices of the given round.

9. A computer system as recited in claim 1 which allocates at least some items among the bidders based on the bids, said computer system further comprising:

second determining means for determining an allocation of the items among the bidders based on the processed bids, following a determination that the auction should end.

10. A computer system as recited in claim 1 which further comprises:

second determining means for determining at least one final price based on the processed bids, following a determination that the auction should end.

11. The computer system as recited in claim 1 wherein the establishing means establishes a price range applicable to an additional round in response to the initiation of the additional round, said price range applicable to the additional round different from the price range established for the given round.

12. The computer system as recited in claim 1 wherein said processing means for processing the received bids treats the bid of the given bidder as a proposal to transact the indicated quantity at all prices within the second interval and as a proposal to transact another quantity at all prices within the first interval, said another quantity based on at least one other bid in the auction by the given bidder, in the event that only a single bid for the at least one type of item is received from the given bidder in the given round.

13. The computer system as recited in claim 1 wherein said processing means for processing the received bids treats a first bid and a second bid of the given bidder in the given round for a given type of item as a proposal to transact the second bid's indicated quantity at a price between the second bid's indicated price and the established ending price, as a proposal to transact the first bid's indicated quantity at a price between the second bid's indicated price and the first bid's indicated price, and as a proposal to transact another quantity at a price between the first bid's indicated price and the established starting price, said another quantity based on at least one other bid in the auction by the given bidder, where the indicated price of the second bid is between the indicated price of the first bid and the established ending price.

14. A system as recited in claim 13 which further comprises:

constraining means for constraining bids for a given type of item received from the given bidder within the given round, said constraining means limiting the indicated quantity of the second bid to be no greater than the indicated quantity of the first bid.

15. A system as recited in claim 1 which further comprises:

constraining means for constraining bids received from the given bidder in the given round, said constraining means limiting said indicated quantity of a given type of item to be no greater than the quantity of the given type of item indicated at a previous round's ending price.

16. A system as recited in claim 1 which further comprises:

constraining means for constraining bids for a given type of item received from the given bidder within the given round, said constraining means limiting the indicated quantity of a second bid to be no greater than the indicated quantity of a first bid, in the event that the indicated price of the second bid is between the indicated price of the first bid and the established ending price of the given round.

17. A computer system for conducting an auction of a plurality of types of items among a plurality of bidders in a plurality of rounds, wherein bids are received and processed by the computer system, said system comprising:

establishing means for establishing a starting price and an ending price for each of a plurality of types of items in a plurality of rounds, said establishing means establishing both a starting price and an ending price prior to the computer system receiving bids within a round, wherein the establishing means includes means to maintain a predetermined relation among the established prices, receiving means for receiving bids, wherein a bid comprises a quantity parameter for at least one type of item and a price parameter signifying a percentage of the distance from the established starting price to the established ending price, and processing means for processing the received bids to determine an allocation of the items among the bidders consistent with the bids in the event that an allocation consistent with the bids is possible, otherwise enabling the establishing means to alter the prices established for at least one type of item.

18. A system as recited in claim 17 wherein the means to maintain a relation among the established prices employs a schedule of prices.

19. A system as recited in claim 17 wherein the means to maintain a relation among the established prices employs an algorithm.

20. A method implemented in a system comprising a plurality of computers, at least one of which is located remotely from at least one other of said computers and interconnected by a communication system, for conducting an auction of at least one type of item among a plurality of bidders in a plurality of rounds, wherein bids are received and processed, said method comprising:
- establishing a starting price, an ending price and a price range, said ending price different from said starting price, and said price range comprising prices between said starting and ending prices, for at least one type of item in a given round of the plurality of rounds,
- receiving bids in the given round on at least one computer of said system and communicating at least some of said bids to at least one remotely-located computer via the communication system, wherein a bid comprises a quantity parameter indicating a quantity of at least one type of item and a price parameter indicating a price within the established price range, said price parameter dividing the established price range into a first interval comprising prices between the indicated price and the established starting price and a second interval comprising prices between the indicated price and the established ending price,
- processing the received bids on the at least one remotely-located computer, said processing treating a bid with said quantity parameter and said price parameter from a given bidder as a proposal to transact the indicated quantity at a price within the second interval and as a proposal to transact another quantity at a price within the first interval, said another quantity based on at least one other bid in the auction by the given bidder,
- determining whether the auction should continue or end, based on the received bids, and
- initiating an additional round, following a determination that the auction should continue.

21. A method as recited in claim 20 which further comprises constraining the changes in a bid from a given bidder in an additional round by considering, in the processing, only bids which satisfy a constraint.

22. A method as recited in claim 20 wherein the quantity parameter of a bid is capable of indicating a quantity other than a quantity of zero and a quantity of unity.

23. A method as recited in claim 22 for conducting an auction of a plurality of types of items among a plurality of bidders in a plurality of rounds, wherein bids are received and processed, wherein:
- said establishing establishes starting prices, ending prices and price ranges for a plurality of types of items in a plurality of rounds.

24. A method as recited in claim 23 which further comprises constraining the changes in a bid from a given bidder in an additional round by considering, in the processing, only bids which satisfy a constraint.

25. A method as recited in claim 24 wherein the constraining includes calculating a sum of quantities bid for a group of types of items.

26. A method as recited in claim 25 wherein the constraining includes comparing the calculated sum with a previous calculated sum for the same group of types of items.

27. A method as recited in claim 23 which further comprises:
- constraining bids received from the given bidder in the given round by limiting a sum of the indicated quantities of a set of types of items to be no greater than a sum of quantities of the set of types of items indicated at a previous round's ending prices.

28. A method as recited in claim 23 which further comprises:
- constraining bids for a set of types of items received from the given bidder within the given round by limiting a sum of the indicated quantities of second bids to be no greater than a sum of the indicated quantities of first bids, in the event that the indicated prices of the second bids are between the indicated prices of the first bids and the established ending prices of the given round.

29. A method as recited in claim 20 which also allocates at least some items among the bidders based on the bids, said method further comprising:
- further determining an allocation of the items among the bidders based on the processed bids, following a determination that the auction should end.

30. A method as recited in claim 20 which further comprises:
- further determining at least one final price based on the processed bids, following a determination that the auction should end.

31. A method as recited in claim 20 wherein the establishing includes establishing a price range applicable to an additional round in response to the initiation of the additional round, said price range applicable to the additional round different from the price range established for the given round.

32. A method as recited in claim 20 wherein said processing the received bids treats the bid of the given bidder as a proposal to transact the indicated quantity at all prices within the second interval and as a proposal to transact another quantity at all prices within the first interval, said another quantity based on at least one other bid in the auction by the given bidder, in the event that only a single bid for the at least one type of item is received from the given bidder in the given round.

33. A method as recited in claim 20 wherein said processing the received bids treats a first bid and a second bid of the given bidder in the given round for a given type of item as a proposal to transact the second bid's indicated quantity at a price between the second bid's indicated price and the established ending price, as a proposal to transact the first bid's indicated quantity at a price between the second bid's indicated price and the first bid's indicated price, and as a proposal to transact another quantity at a price between the first bid's indicated price and the established starting price, said another quantity based on at least one other bid in the auction by the given bidder, where the indicated price of the second bid is between the indicated price of the first bid and the established ending price.

34. A method as recited in claim 33 which further comprises:
- constraining bids for a given type of item received from the given bidder within the given round by limiting the indicated quantity of the second bid to be no greater than the indicated quantity of the first bid.

35. A system as recited in claim 4 which further comprises:
- constraining means for constraining bids received from the given bidder in the given round, said constraining means limiting a sum of the indicated quantities of a set of types of items to be no greater than a sum of quantities of the set of types of items indicated at a previous round's ending prices.

36. A method as recited in claim 20 which further comprises:
   constraining bids received from the given bidder in the given round by limiting said indicated quantity of a given type of item to be no greater than the quantity of the given type of item indicated at a previous round's ending price.

37. A method as recited in claim 20 which further comprises:
   constraining bids for a given type of item received from the given bidder within the given round by limiting the indicated quantity of a second bid to be no greater than the indicated quantity of a first bid, in the event that the indicated price of the second bid is between the indicated price of the first bid and the established ending price of the given round.

38. A method implemented in a system comprising a plurality of computers, at least one of which is located remotely from at least one other of said computers and interconnected by a communication system, for conducting an auction of a plurality of types of items among a plurality of bidders in a plurality of rounds, wherein bids are received and processed, said method comprising:
   establishing a starting price and an ending price for each of a plurality of types of items in a plurality of rounds, said establishing including establishing both a starting price and an ending price prior to said system receiving bids within a round, wherein the establishing includes maintaining a predetermined relation among the established prices,
   receiving bids on at least one computer of said system and communicating at least some of said bids to at least one remotely-located computer via the communication system, wherein a bid comprises a quantity parameter for at least one type of item and a price parameter signifying a percentage of the distance from the established starting price to the established ending price, and
   processing the received bids on the at least one remotely-located computer to determine an allocation of the items among the bidders consistent with the bids in the event that an allocation consistent with the bids is possible, otherwise altering the established prices for at least one type of item.

39. A method as recited in claim 38 wherein the relation among the established prices is determined by a schedule.

40. A method as recited in claim 38 wherein the relation among the established prices is determined by an algorithm.

41. A non-transitory computer readable medium storing a sequence of instructions which, when executed on a system comprising a plurality of computers, at least one of which is located remotely from at least one other of said computers and interconnected by a communication system, implements a method for conducting an auction of at least one type of item among a plurality of bidders in a plurality of rounds, wherein bids are received and processed, said method comprising:
   establishing a starting price, an ending price and a price range, said ending price different from said starting price, and said price range comprising prices between said starting and ending prices for at least one type of item in a given round of the plurality of rounds,
   receiving bids in the given round on at least one computer of said system and communicating at least some of said bids to at least one remotely-located computer via the communication system, wherein a bid comprises a quantity parameter indicating a quantity of at least one type of item and a price parameter indicating a price within the established price range, said price parameter dividing the established price range into a first interval comprising prices between the indicated price and the established starting price and a second interval comprising prices between the indicated price and the established ending price,
   processing the received bids on the at least one remotely-located computer, said processing treating a bid with said quantity parameter and said price parameter from a given bidder as a proposal to transact the indicated quantity at a price within the second interval and as a proposal to transact another quantity at a price within the first interval, said another quantity based on at least one other bid in the auction by the given bidder,
   determining whether the auction should continue or end, based on the received bids, and
   initiating an additional round, following a determination that the auction should continue.

42. A computer readable medium as recited in claim 41 wherein the quantity parameter of a bid is capable of indicating a quantity other than a quantity of zero and a quantity of unity.

43. A computer readable medium as recited in claim 42 storing a sequence of instructions which, when executed, implements a method for conducting an auction of a plurality of types of items among a plurality of bidders in a plurality of rounds, wherein bids are received and processed, wherein:
   said establishing establishes starting prices, and ending prices and price ranges for a plurality of types of items.

44. A computer readable medium as recited in claim 43 wherein the method further comprises constraining the changes in a bid from a given bidder in an additional round by considering, in the processing, only bids which satisfy a constraint.

45. A computer readable medium as recited in claim 44 wherein the constraining includes calculating a sum of quantities bid for a group of types of items.

46. A computer readable medium as recited in claim 45 wherein the constraining includes comparing the calculated sum with a previous calculated sum for the same group of types of items.

47. A computer readable medium as recited in claim 43 wherein said processing the received bids further comprises constraining bids received from the given bidder in the given round by limiting a sum of the indicated quantities of a set of types of items to be no greater than a sum of quantities of the set of types of items indicated at a previous round's ending prices.

48. A computer readable medium as recited in claim 43 wherein said processing the received bids further comprises constraining bids for a set of types of items received from the given bidder within the given round by limiting a sum of the indicated quantities of second bids to be no greater than a sum of the indicated quantities of first bids, in the event that the indicated prices of the second bids are between the indicated prices of the first bids and the established ending prices of the given round.

49. A computer readable medium as recited in claim 41 wherein the method further comprises constraining the changes in a bid from a given bidder in an additional round by considering, in the processing, only bids which satisfy a constraint.

50. A computer readable medium as recited in claim 41, said method further comprising:

further determining an allocation of the items among the bidders based on the processed bids, following a determination that the auction should end.

51. A computer readable medium as recited in claim 41, said method further comprising:

further determining at least one final price based on the processed bids, following a determination that the auction should end.

52. A computer readable medium as recited in claim 41 wherein the establishing includes establishing a price range applicable to an additional round in response to the initiation of the additional round, said price range applicable to the additional round different from the price range established for the given round.

53. A computer readable medium as recited in claim 41 wherein said processing the received bids treats the bid of the given bidder as a proposal to transact the indicated quantity at all prices within the second interval and as a proposal to transact another quantity at all prices within the first interval, said another quantity based on at least one other bid in the auction by the given bidder, in the event that only a single bid for the at least one type of item is received from the given bidder in the given round.

54. A computer readable medium as recited in claim 41 wherein said processing the received bids treats a first bid and a second bid of the given bidder for a given type of item in the given round as a proposal to transact the second bid's indicated quantity at a price between the second bid's indicated price and the established ending price, as a proposal to transact the first bid's indicated quantity at a price between the second bid's indicated price and the first bid's indicated price, and as a proposal to transact another quantity at a price between the first bid's indicated price and the established starting price, said another quantity based on at least one other bid in the auction by the given bidder, where the indicated price of the second bid is between the indicated price of the first bid and the established ending price.

55. A computer readable medium as recited in claim 54 wherein said processing the received bids further comprises constraining bids for a given type of item received from the given bidder within the given round by limiting the indicated quantity of the second bid to be no greater than the indicated quantity of the first bid.

56. A computer readable medium as recited in claim 41 wherein said processing the received bids further comprises constraining bids received from the given bidder in the given round by limiting said indicated quantity of a given type of item to be no greater than the quantity of the given type of item indicated at a previous round's ending price.

57. A computer readable medium as recited in claim 41 wherein said processing the received bids further comprises constraining bids for a given type of item received from the given bidder within the given round by limiting the indicated quantity of a second bid to be no greater than the indicated quantity of a first bid, in the event that the indicated price of the second bid is between the indicated price of the first bid and the established ending price of the given round.

58. A non-transitory computer readable medium storing a sequence of instructions which, when executed on a system comprising a plurality of computers and a communication system, implements a method for conducting an auction of a plurality of types of items among a plurality of bidders in a plurality of rounds, wherein bids are received and processed, said method comprising:

establishing a starting price and an ending price for a plurality of types of item in a plurality of rounds, said establishing including establishing both a starting price and an ending price prior to said computer system receiving bids within a round, wherein the establishing includes maintaining a relation among the established prices, receiving bids on at least one computer of said system and communicating at least some of said bids to at least one-remotely located computer via the communication system, wherein a bid comprises a quantity parameter for at least one type of item and a price parameter signifying a percentage of the distance from the established starting price to the established ending price for said type of item, and processing the received bids on the at least one remotely-located computer to determine an allocation of the items among the bidders consistent with the bids in the event that an allocation consistent with the bids is possible, otherwise altering the established prices for at least one type of item.

59. A computer readable medium as recited in claim 58 wherein the relation among the established prices is determined by a schedule.

60. A computer readable medium as recited recited in claim 58 wherein the relation among the established prices is determined by an algorithm.

* * * * *